United States Patent
Hunt et al.

(10) Patent No.: US 11,146,415 B2
(45) Date of Patent: Oct. 12, 2021

(54) MESSAGE-LIMITED SELF-ORGANIZING NETWORK GROUPS FOR COMPUTING DEVICE PEER MATCHING

(71) Applicant: Microsoft Technology Licensing, LLC, Redmond, WA (US)

(72) Inventors: Brandon T. Hunt, Redmond, WA (US); Alexander Burba, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 16/686,143

(22) Filed: Nov. 16, 2019

(65) Prior Publication Data
US 2021/0152381 A1    May 20, 2021

(51) Int. Cl.
*G06F 15/16*    (2006.01)
*H04L 12/18*    (2006.01)
(Continued)

(52) U.S. Cl.
CPC ........ *H04L 12/185* (2013.01); *H04L 12/1854* (2013.01); *H04L 12/1881* (2013.01);
(Continued)

(58) Field of Classification Search
CPC ............... H04L 12/185; H04L 12/1881; H04L 67/1053; H04L 41/0893
See application file for complete search history.

(56) References Cited

U.S. PATENT DOCUMENTS 5,436,905 A * 7/1995 Li ........................ H04L 12/423
370/346
7,461,130 B1  12/2008 AbdelAziz et al.
(Continued)

FOREIGN PATENT DOCUMENTS

EP    1515520 A2    3/2005
EP    1978689 A1    10/2008
(Continued)

OTHER PUBLICATIONS

Boukerche, et al., "An efficient leader election protocol for mobile networks", In Proceedings of the international conference on Wireless communications and mobile computing, Jul. 3, 2006, pp. 1129-1134.
(Continued)

*Primary Examiner* — Richard G Keehn

(57) ABSTRACT

A message-limiting mechanism for enabling computing devices to self-organize into groups based on network proximity can entail the transmission of values based on hierarchical evaluation such that only a computing device having a most extreme value continues to transmit. The values utilized can be randomly generated and their broadcast can facilitate the identification of computing devices that are proximate, by network distance. Each computing device can retain a most extreme value received, unless a value generated by that computing device itself is more extreme, in which case the computing device can continue periodic broadcasts of its value. Each computing device can report its retained values, or its own value if no values were retained, and groupings can be generated based on the values reported by the computing devices. The grouping of computing devices can then facilitate the identification of peers, including for purposes of downloading content from such peers.

20 Claims, 14 Drawing Sheets

(51) Int. Cl.
      *H04L 12/24*       (2006.01)
      *H04L 29/08*       (2006.01)

(52) U.S. Cl.
    CPC ...... *H04L 12/1886* (2013.01); *H04L 41/0893* (2013.01); *H04L 67/1044* (2013.01); *H04L 67/1053* (2013.01); *H04L 67/18* (2013.01)

(56) References Cited

U.S. PATENT DOCUMENTS

| | | |
|---|---|---|
| 7,532,585 B2 | 5/2009 | Kim et al. |
| 7,895,311 B1 | 2/2011 | Juenger |
| 9,602,573 B1 | 3/2017 | Abu-Ghazaleh et al. |
| 2006/0168084 A1* | 7/2006 | Kogan ............... H04L 67/1023 709/207 |
| 2007/0249341 A1* | 10/2007 | Chu ..................... H04W 16/02 455/434 |
| 2008/0059631 A1 | 3/2008 | Bergstrom et al. |
| 2010/0046363 A1 | 2/2010 | Shenoy et al. |
| 2014/0173022 A1 | 6/2014 | Morrison et al. |
| 2020/0235988 A1* | 7/2020 | Lin ........................ G06F 16/27 |

FOREIGN PATENT DOCUMENTS

| | | |
|---|---|---|
| WO | 2014130153 A1 | 8/2014 |
| WO | 2016085219 A1 | 6/2016 |

OTHER PUBLICATIONS

"International Search Report and Written Opinion Issued in PCT Application No. PCT/US20/057586", dated Mar. 16, 2021, 12 Pages.

\* cited by examiner

MESSAGE-LIMITED SELF-ORGANIZING NETWORK GROUPS FOR COMPUTING DEVICE PEER MATCHING

BACKGROUND

The ubiquity of networked computing devices has increased the quantity of digital content available for download, and has also caused network downloads to become the preferred method by which digital content is provided to multiple computing devices. Typically, such digital content is originally made available from source computing devices, from where it is downloaded to destination computing devices consuming such digital content. However, in many instances a single source computing device may be required to provide many thousands of copies of the same digital content to thousands of different destination computing devices.

To provide for faster and more efficient obtaining of digital content, digital content can be downloaded, not from an original source computing device, but rather from a more conveniently located destination computing device that has previously downloaded the same digital content. For example, rather than downloading an operating system update from the operating system developer, one computer utilized by a family can download the update from another computer utilized by the same family that has previously downloaded the operating system update from the operating system developer. Assuming both computing devices are networked together through the family's in-home network, the transfer of the operating system update between such computing devices can be orders of magnitude faster than requiring both computing devices to independently obtain the operating system update across the Internet, or other like worldwide network, directly from the operating system developer. Moreover, the quantity of digital data transmitted from the operating system developer can be decreased, as copies of the operating system update can be, instead, obtained from other computing devices. In the above example, only a single copy of the operating system update need be downloaded by the family, with each computing device connected to the family's in-home network receiving a copy from another computing device that is also connected to, and part of, the family's in-home network.

While the above example can realize benefits for the family, such as by decreasing the quantity of data transmitted through the family's network service provider, thereby reducing the possibility of exceeding data limits enforced by the network service provider, and such as by increasing the speed with which subsequent computing devices coupled to the family's in-home network obtain the operating system update, such benefits can be many orders of magnitude more significant for the operators of large intranets of computing devices, such as are commonly found in corporations, large businesses, educational institutions, governmental agencies, and other like large groups of computer users. Often, the network administrators of such intranets are under significant cost and efficiency pressures to reduce the quantity of digital data communicated between the intranet and other networks, such as the ubiquitous Internet.

However, in intranets comprised of many hundreds or thousands of computing devices, the network proximity between such computing devices can be misleading. For example, corporate intranets can often communicate through communicational tunnels extending across the Internet, such that two computing devices may appear to be physically proximate, but may be located on opposite sides of the world. While downloading digital content from other computing devices communicationally coupled to the same intranet may be faster than obtaining it from other computing devices across the Internet, there can be significant efficiency advantages in obtaining the digital content from other computing devices, coupled to the same intranet, that are proximate, by network communicational connections, to the computing device seeking to obtain the digital content. Moreover, by being able to identify computing devices that are proximate, by network communication connections, to the computing device seeking to obtain the digital content, the disadvantage of transmitting data across the Internet, and thereby incurring network communication charges, as well as other inefficiencies, can be minimized.

Mechanisms by which computing devices self-organize into groups, such as leader election and/or consensus algorithms, generate large quantities of digital communications being exchanged by the computing devices across the intranets to which they are communicationally coupled, and, in some instances, across the Internet itself. Such large quantities of digital communications can bog down other digital communications, rendering the entire intranet, or other like subnetwork, less efficient, and increasing the costs of deploying and maintaining such an intranet.

SUMMARY

A message-limiting mechanism for enabling computing devices to self-organize into groups, such as into groups based on network proximity, can entail the transmission of values based on hierarchical evaluation such that only a computing device having a most extreme value continues to transmit, and recipient computing devices can self-organize into groups based on a most extreme value received by such recipient computing devices. The values utilized can be randomly generated and their broadcast can facilitate the identification of computing devices that are proximate, by network distance, to one another. Each computing device can retain a most extreme value received, unless a value generated by that computing device itself is more extreme, in which case the computing device can continue periodic broadcasts of such a value. The retention of received values can expire if periodic retransmissions of the value are not received. Each computing device can report its retained values, or its own value if no values were retained, and groupings can be generated based on the values reported by the computing devices. Various efficiencies can be implemented, such as staggering the times when computing devices would broadcast their values or delaying the reporting of values until they had been received multiple times. The grouping of computing devices can then facilitate the identification of peers, such as for purposes of downloading content from such peers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1A:
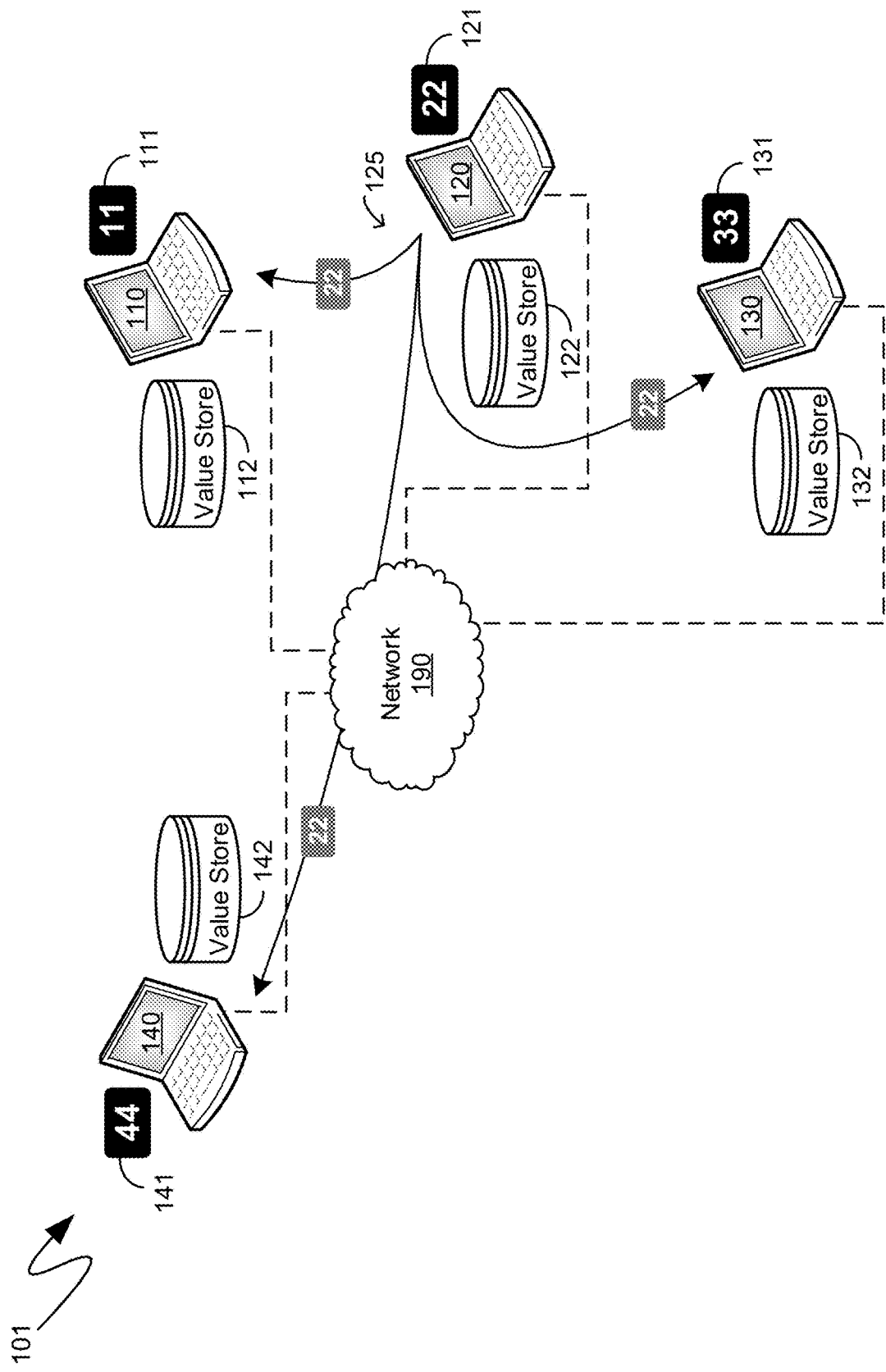
FIGS. 1a-1d are system diagrams of an exemplary system illustrating an exemplary message exchange for self-organization.

The following description relates to the self-organization of networked computing devices into groups based on network proximity to facilitate peer matching. A message-limiting mechanism can entail the transmission of values based on hierarchical evaluation such that only a computing device having a most extreme value continues to transmit, and recipient computing devices can self-organize into groups based on a most extreme value received by such recipient computing devices. The values utilized can be randomly generated and their broadcast can facilitate the identification of computing devices that are proximate, by network distance, to one another. Each computing device can retain a most extreme value received, unless a value generated by that computing device itself is more extreme, in which case the computing device can continue periodic broadcasts of such a value. The retention of received values can expire if periodic retransmissions of the value are not received. Each computing device can report its retained values, or its own value if no values were retained, and groupings can be generated based on the values reported by the computing devices. Various efficiencies can be implemented, such as staggering the times when computing devices would broadcast their values or delaying the reporting of values until they had been received multiple times. The grouping of computing devices can then facilitate the identification of peers, such as for purposes of downloading content from such peers.

The techniques described herein make reference to evaluations of comparison, such as "greater than" or "less than". However, as will be recognized by those skilled in the art, the mechanisms described are agnostic as to the numerical relationship between more extreme and less extreme values. For example, the techniques described herein organize computing devices in accordance with randomly selected values, with a computing device having a highest value implementing described functionality, and computing devices having lower values implementing different functionality. Such techniques, however, are equally applicable if a computing device having a lowest value was selected to implement one set of functionality, while computing devices having higher values implemented the other set of functionality. Such techniques are also equally applicable if a computing device having a value closest to zero was selected to implement one set of functionality, while computing devices having values whose absolute value is further from zero were selected to implement the other set of functionality. Such techniques are also equally applicable if a computing device having a value closest to, for example, thirteen (or any other value), was selected to implement one set of functionality, while computing devices having values further away were selected to implement the other set of functionality. Accordingly, and only for ease of reference, and not by way of limitation, the techniques described are illustrated within the context of numerically larger values being utilized as the basis for selecting which set of functionality a computing device implements.

However, to encompass all of the evaluations of comparison that can equally implement the described mechanisms, the term "greater than", as utilized herein, means a numerical value that is closest to a selected differentiator, and the term "less than", as utilized herein, means a numerical value that is further from the selected differentiator. Thus, "greater than" means "numerically larger" within the illustrative examples shown in the Figures, and, similarly, "less than" means "numerically smaller". However, within an implementation where the smallest numerical value is to be utilized to select a computing device, from among others, the term "greater than" will mean "numerically smaller" and the term "less than" will mean "numerically larger". Similarly, within an implementation of where the numerical value whose absolute value is closest to zero is to be utilized to select a computing device, from among others, the term "greater than" will mean "numerically closer to zero" and the term "less than" will mean "numerically farther from zero". Similarly, within an implementation of where the numerical value closest to, for example, thirteen, is to be utilized to select a computing device, from among others, the term "greater than" will mean "numerically closer to thirteen" and the term "less than" will mean "numerically farther from thirteen". Referring back to the explicit definitions provided, in the first example, a value of positive infinity was utilized as the differentiator, with numerically larger values being selected over numerically smaller values; in the second example, a value of negative infinity was utilized as the differentiator, with numerically smaller values being selected over numerically larger ones; in the third example, a value of zero was utilized as the differentiator, with values numerically closer to zero being selected over values numerically farther from zero; in the fourth example of value of thirteen was utilized as the differentiator, with values numerically closer to thirteen being selected over values numerically farther from thirteen; and so on. Accordingly, the special definitions of "greater than" and "less than" that are explicitly provided, accommodate (as well as can be accommodated within the confines of language), the intended scope of the mechanisms described and claimed.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1a, an exemplary system 101 is illustrated, providing context for some of the descriptions below. The exemplary system 101 is illustrated as comprising four computing devices, namely the exemplary computing devices 110, 120, 130 and 140, which can be communicationally coupled to one another through a network, such as the exemplary network 190. According to one aspect, the network 190 can comprise an unknown quantity of intermediate network devices, such that the exemplary computing devices 110, 120, 130 and 140 may or may not be close to one another in terms of network proximity. For example, three of the exemplary computing devices illustrated may be co-located on one floor of a single building, while the fourth computing device may be utilizing a network communication tunnel, such as a Virtual Private Network (VPN), to appear is if it is physically proximate to the other three computing devices, but which, instead, may be physically located a great distance away, with many intermediate network devices between it and the other three computing devices.

For purposes of identifying peers, it can be beneficial to group computing devices in accordance with network proximity, since computing devices that are proximate to one another, in terms of network connectivity, with few intermediate network or other computing devices, may be able to obtain digital content from one another more quickly and more efficiently, and, therefore, can be more optimal peers for purposes of digital content sharing, transmission and/or distribution. However, the identification of peers can entail the transmission of large quantities of messages across a network, such as the exemplary network 190. Such messages can clog the network, or otherwise negatively impact networking functionality.

According to one aspect, therefore, to provide for self-organization of computing devices into groups according to network proximity, while limiting and/or reducing a quantity of messages exchanged, each of the computing devices can derive values by which they can comparatively evaluate one another. For example, such values can be randomly generated, or randomly selected from a predetermined range. As another example such values can be based on unique identifiers of computing devices, such as unique network addresses, unique hardware identifiers, unique machine or operating system identifiers, or other like unique identifiers. As yet another example, such values can be combinations of any of the above. For purposes of illustration, the exemplary computing devices 110, 120, 130 and 140 are illustrated as having derived values 111, 121, 131 and 141, respectively. For ease of description of the intended mechanisms, the derived values 111, 121, 131 and 141 are shown in white numerals within the Figures and are referred to herein by their identifiers, and not their indicated numerical quantity and/or value. As will be recognized by those skilled in the art, such white numerals represent exemplary derived values, and not the numerical identifiers utilized within patent Figures to provide unique reference by which such elements can be nominated in the descriptions provided in the Specification.

A self-organization can commence when one of the computing devices, such as, for example, the exemplary computing device 120, broadcasts a message to other computing devices on the network 190, such as the exemplary computing devices 110, 130 and 140, informing such other computing devices of its derived value 121. The broadcast 125 can be limited by the hardware implementing the network 190. For example, routers, switches, and other like network devices can limit the delivery of broadcast messages to specific subsets of computing devices. Such subsets of computing devices can represent delineated groupings within the context of the establishment of the network to which the computing devices are communicationally coupled, such as the exemplary network 190, and, consequently, a broadcast message can, by virtue of the setup of such networking hardware, travel to those computing devices that are, in fact, close, by network proximity, to the computing device issuing such a broadcast message.

Alternatively, or in addition, the exemplary broadcast message 125 can specify a maximum quantity of network hops beyond which it is not to be broadcast. In such an instance, metadata can travel with the broadcast message 125 that can indicate a quantity of hops remaining at each network device.

According to one aspect, upon receiving a message, such as the exemplary message 125, the recipient computing devices, such as the exemplary computing devices 110, 130 and 140, can compare the value provided in the message 125, in this case the exemplary value 121, to values that can have been generated by the recipient computing devices. For example, the exemplary computing device 110 can compare the value 121, received via the broadcast message 125, to an internally generated value 111. In the exemplary system 101, as can be seen from FIG. 1a, the computing device 110 can conclude that the value 121 is greater than the value 111 and, consequently, as a result of such a determination, can retain the value 121 in a value store 112 associated with the computing device 110. For example, the value store 112 can be a data structure maintained on a storage medium of the computing device 110. As another example, the value store 112 can be maintained on an external device, or by or on a separate computing device, on behalf of the exemplary computing device 110. In addition, as a result of determining that the received value 121 is greater than the internally generated value 111, the computing device 110 can prevent the transmission of any broadcast messages, transmitting the value 111, from the computing device 110 itself. More specifically, since the computing device 110 can already determine that at least one other computing device has a value greater than its internally generated value, there is no point in transmitting the value 111, since such transmission would only increase the quantity of messages exchanged over the exemplary network 190. Accordingly, the computing device 110, upon determining that the perceived value 121 is greater than the internally generated value 111, can choose to not transmit any broadcast messages, transmitting the value 111, from the computing device 110 itself. For example, as will be detailed further below, such broadcast messages can be scheduled to occur periodically. As another example, also detailed further below, such broadcast messages can start with an initial broadcast time that can be determined in advance. In such examples, the computing device 110, upon the occurrence of a time at which the computing device 110 would have generated and transmitted a broadcast message transmitting the value 111, the computing device 110 can, instead, not generate or transmit such a broadcast message.

The exemplary computing devices 130 and 140 can, likewise, compare the value 121, received by such computing devices via the broadcast message 125, to the values internally generated by such computing devices, namely the values 131 and 141, respectively. As illustrated, the exemplary computing devices 130 and 140 can determine that the value 121 is not greater than their internally generated values 131 and 141, respectively. As a result of such a determination, according to one aspect, the exemplary computing devices 130 and 140 can disregard the value 121, or otherwise not retain it in their corresponding value stores, such as the exemplary value stores 132 and 142, respectively.

Figure 1B:
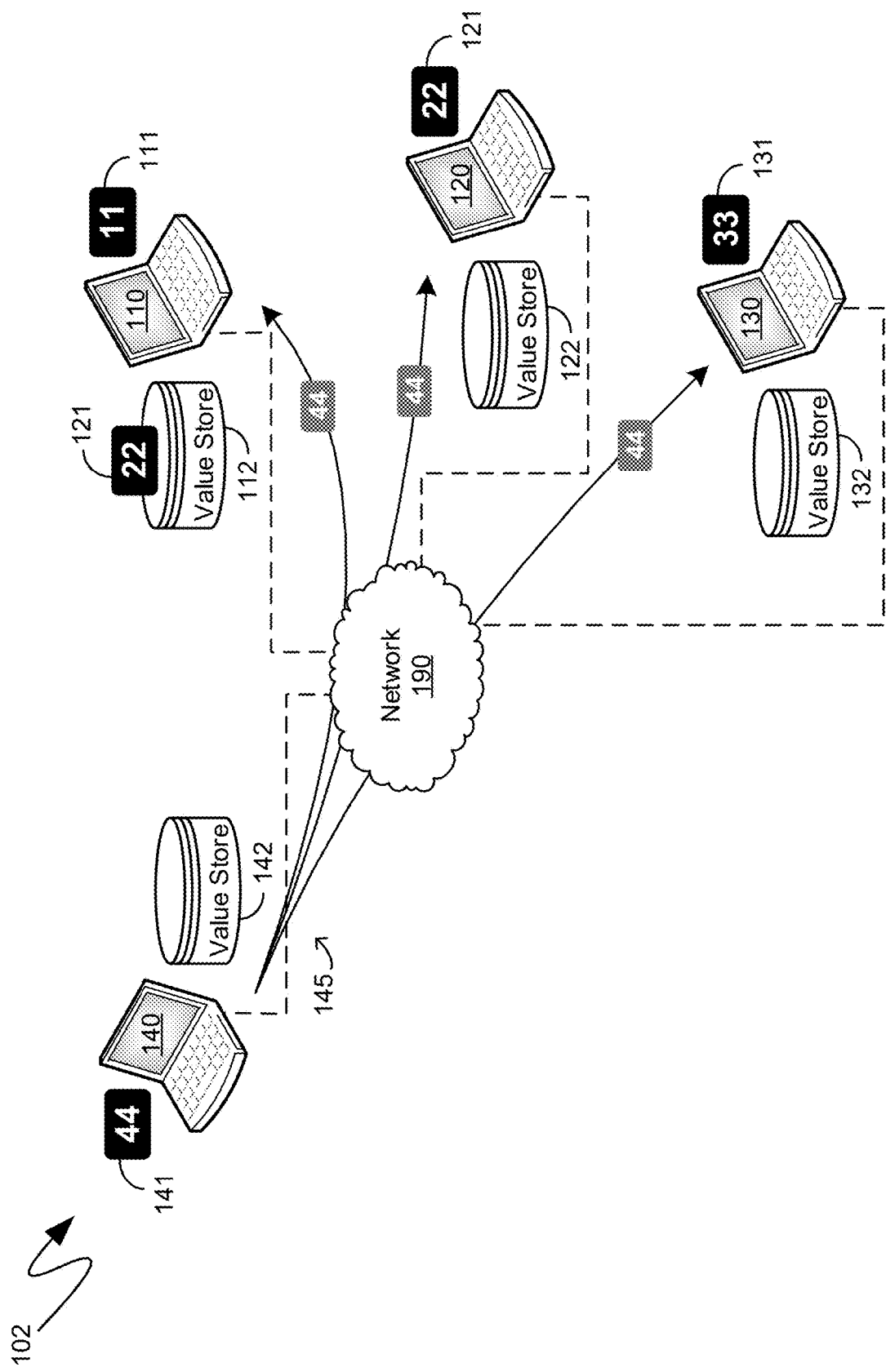

Instead, according to one aspect, in response to determining that the value 121 is not greater than their internally generated values, one or more of the exemplary computing devices 130 and 140 can utilize such a determination to trigger their own broadcast of their own internally generated values. Turning to FIG. 1b, the exemplary system 102 shown therein illustrates an exemplary broadcast 145 of the value 141 from the computing device 140, such as in response to receiving the broadcast message 125, from the computing device 120, shown in FIG. 1a, and determining that the value 121 transmitted thereby was less than the value 141 generated by the computing device 140. Although not shown for simplicity of illustration, computing device 130 can have similarity generated and transmitted a broadcast message, broadcasting the value 131, in response to receiving the broadcast message 125. Alternatively, or in addition, the transmission of broadcast messages in response to receipt of broadcast messages broadcasting values that are determined to be less than the internally generated values, can be staggered, such as in the manner detailed below and, as such, the exemplary computing device 130 may have been staggered to transmit a responsive broadcast message after the exemplary computing device 140 generated and transmitted the broadcast 145. In addition, the exemplary system 102 illustrates the effect, at the computing device 110, of having received the broadcast message 125, namely that the exemplary value store 112, associated with the computing device 110, now contains the value 121 retained therein.

Figure 1C:
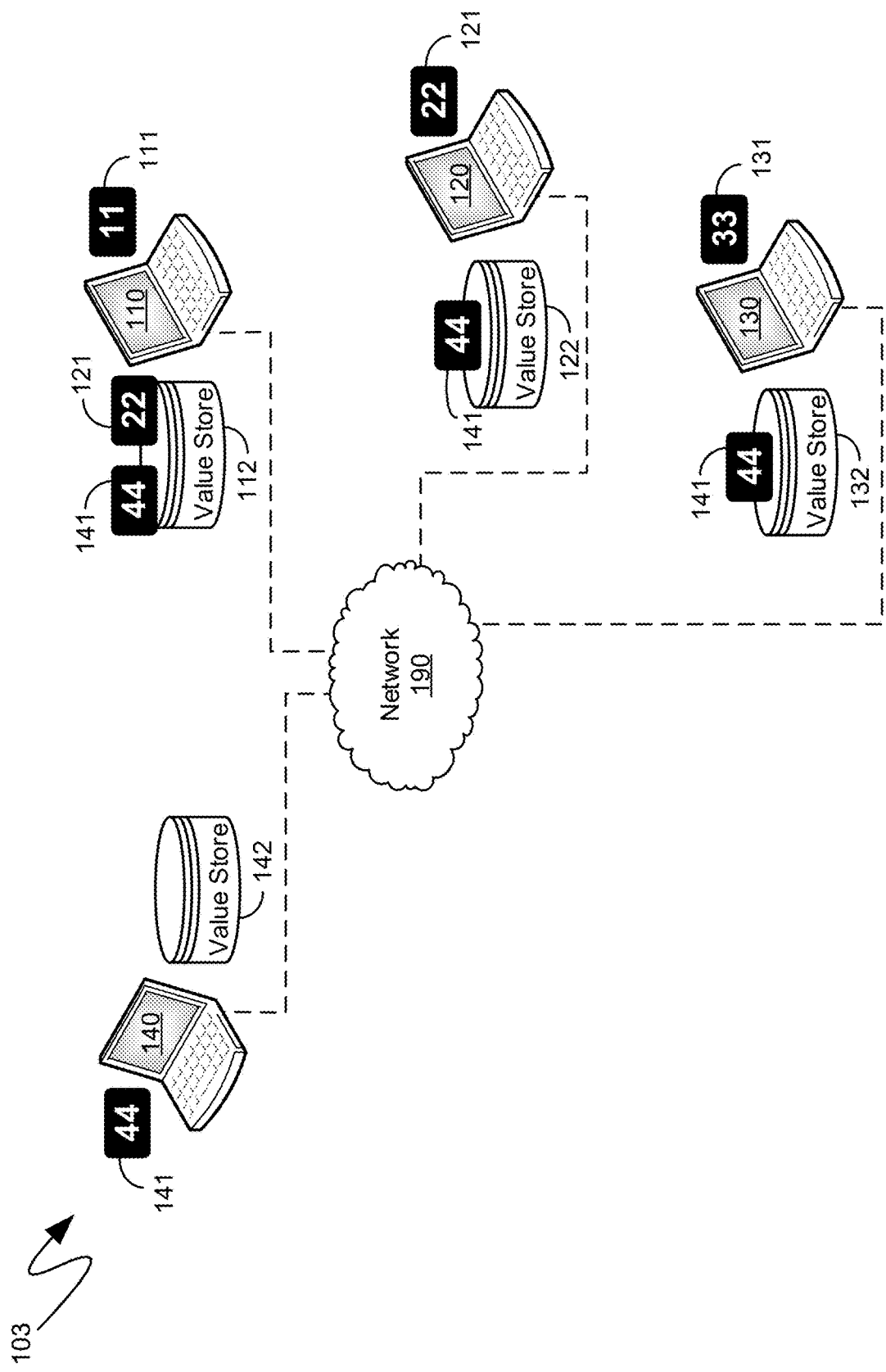

As before, upon receipt of the broadcast message 145, each of the receiving computing devices, such as the exemplary computing devices 110, 120 and 130, can compare the value 141, transmitted in the message 145, to an internally generated value, namely the exemplary values 111, 121 and 131, respectively. Turning to FIG. 1c, the exemplary system 103 shown therein illustrates an exemplary outcome of such a comparison. More specifically, within the illustrated example, the computing device 110 can compare the received value 141, received via the broadcast message 145, shown in FIG. 1b, to the internally generated value 111, and, as shown in FIG. 1b, can conclude that the received value 141 is larger. Accordingly, as shown in the exemplary system 103 of FIG. 1c, the exemplary value store 112, associated with the computing device 110, can have retained therein the value 141 as a result of the determination that the value 141 is greater than the internally generated value 111. In a similar manner, the exemplary computing device 120 can determine that the received value 141, received via the broadcast message 145, shown in FIG. 1b, is greater than the internally generated value 121, and, as a result, can retain the value 141 in the exemplary value store 122 associated with the computing device 120. Likewise, the exemplary computing device 130 can determine that the received value 141 is greater than the internally generated value 131, and, as a result, can retain the value 141 in the exemplary value store 132 associated with the computing device 130. Thus, as illustrated in the exemplary system 103, shown in FIG. 1c, the exemplary value store 122, associated with the computing device 120, and the exemplary value store 132, associated with the computing device 130, can both have retained therein the value 141.

As indicated previously, a determination that a received value is greater than an internally generated value can cause a computing device to no longer broadcast its internally generated value. Thus, for example, the exemplary system 301, shown in FIG. 1c, can represent a time when the periodicity of the broadcast message 125, shown in FIG. 1a, called for the value 121 to be broadcast again, by the computing device 120. However, as detailed above, the computing device 120 can have determined that the received value 141 was greater than the internally generated value 121. Accordingly, the computing device 120 can no longer send broadcast messages broadcasting the value 121. Thus, no broadcast message, from the computing device 120, is shown in the exemplary system 103 of FIG. 1c.

According to one aspect, computing devices can retain received values in value stores associated with such computing devices for a predetermined amount of time. Consequently, if a repeated transmission of the value is not received within the predetermined amount of time, or, stated differently, if a quantity of time since a retained value was last received has exceeded a threshold amount of time, the retained value can be expired, or otherwise removed, from the value store. Thus, for example, the exemplary value store 112, associated computing device 110, can have retained therein both the value 141, received from the broadcast message 145, shown in FIG. 1b, as well as the value 121, received from the broadcast message 125, transmitted prior to the broadcast message 145, and shown in FIG. 1a. However, as indicated previously, the computing device 120, having received the value 141, via the broadcast message 145, can no longer be transmitting broadcasts of its value 121. Consequently, at some point, the retained value 121, in the value store 112, will expire, or otherwise be removed because it was last received more than a threshold quantity of time ago.

Figure 1D:
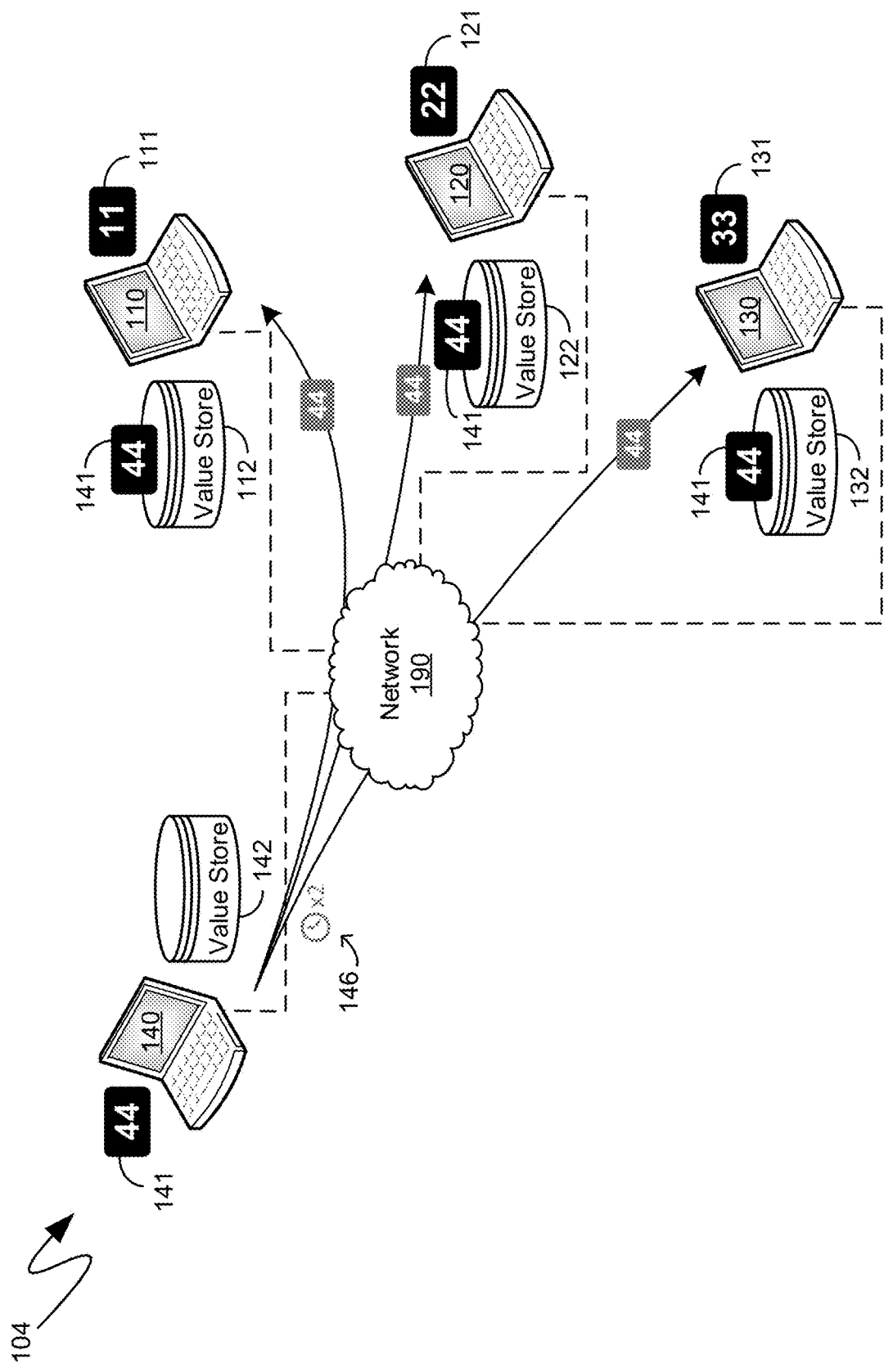

Turning to FIG. 1d, the exemplary system 104 shown therein illustrates a time subsequent to that represented by the exemplary system 103 of FIG. 1c. As can be seen, within the exemplary system 104, the exemplary value store 112, associated with the computing device 110, can no longer retain the value 121, because, as indicated previously, the last receipt of the value 121, back at the time illustrated by the exemplary system 101 of FIG. 1a, can have occurred more than the threshold amount of time ago. Conversely, as also illustrated by the exemplary system 104, a subsequent broadcast message 146, again transmitting the value 141, can be transmitted by the computing device 140. More specifically, since the exemplary computing device 140 has not previously received, or has not recently received, such as within a threshold amount of time, a value higher than the internally generated value 141, the exemplary computing device 140 can never have chosen to stop periodic transmissions of the value 141, or, if the exemplary computing device 140 had previously chosen to stop such periodic transmissions, the fact that no value higher than the internally generated value 141 has been previously received within the threshold amount of time, can have caused the exemplary computing device 140 to restart such periodic transmissions of the value 141. In either case, a retransmission of the value 141, such as via the broadcast message 146, can occur, as illustrated by the exemplary system 104.

According to one aspect, the periodicity with which values are broadcast by the computing devices, such as the exemplary computing devices 110, 120, 130 and 140, can be established in advance and it can be informed by the delay, or the threshold amount of time, after which retained values can be expired from value stores. For example, the periodicity of broadcasts can be such that at least one additional broadcast will be scheduled to be transmitted prior to the time when a value, added or refreshed by an immediately preceding broadcast, will be expired from a value store. Thus, in such an example, a value can be expired from a value store after ten seconds, and a periodicity of broadcasting can be nine seconds. As another example, the periodicity of broadcasts can be such that two or more additional broadcasts will be scheduled to be transmitted prior to a time when a value, added or refreshed by an immediately preceding broadcast, will be expired from a value store. In such an instance, the value can be retained in a value store even if a broadcast is inadvertently missed, such as by failing to be properly delivered by underlying networking hardware, or failing to be received by an error or malfunction on the part of a recipient computing device.

To avoid simultaneous conflicting broadcasts, according to one aspect, an initial time when a computing device transmits a first broadcast, in the absence of any prior broadcast being received by that computing device, such an initial time can be established randomly. Such a randomly established time can randomly vary among the different computing devices such as, for example, the exemplary computing devices 110, 120, 130 and 140. Accordingly, it is unlikely that two or more such computing devices will transmit a first broadcast at approximately the same time, thereby resulting in an inefficient conflict of messages. According to one aspect, the first broadcast can be scheduled to occur a random amount of time after a threshold event, such as a boot of an operating system executing on the computing device, or a startup of the computing device itself, or of one or more applications or utilities executing on the computing device, or of one or more hardware components of the computing device, such as, for example, a network hardware component.

As can be seen from the above descriptions, the mechanisms detailed in essence provide a way for computing devices to identify their peers, either based on a threshold quantity of hops, established as part of the broadcast, or based on how broadcasts are handled by the underlying networking hardware and infrastructure. Stated differently, communication among computing devices can identify, through broadcast messages, and an agreement upon an extreme value, the closest computing devices, by network proximity, based on the way the network was established and the relevant networking devices interconnected.

Figure 2A:
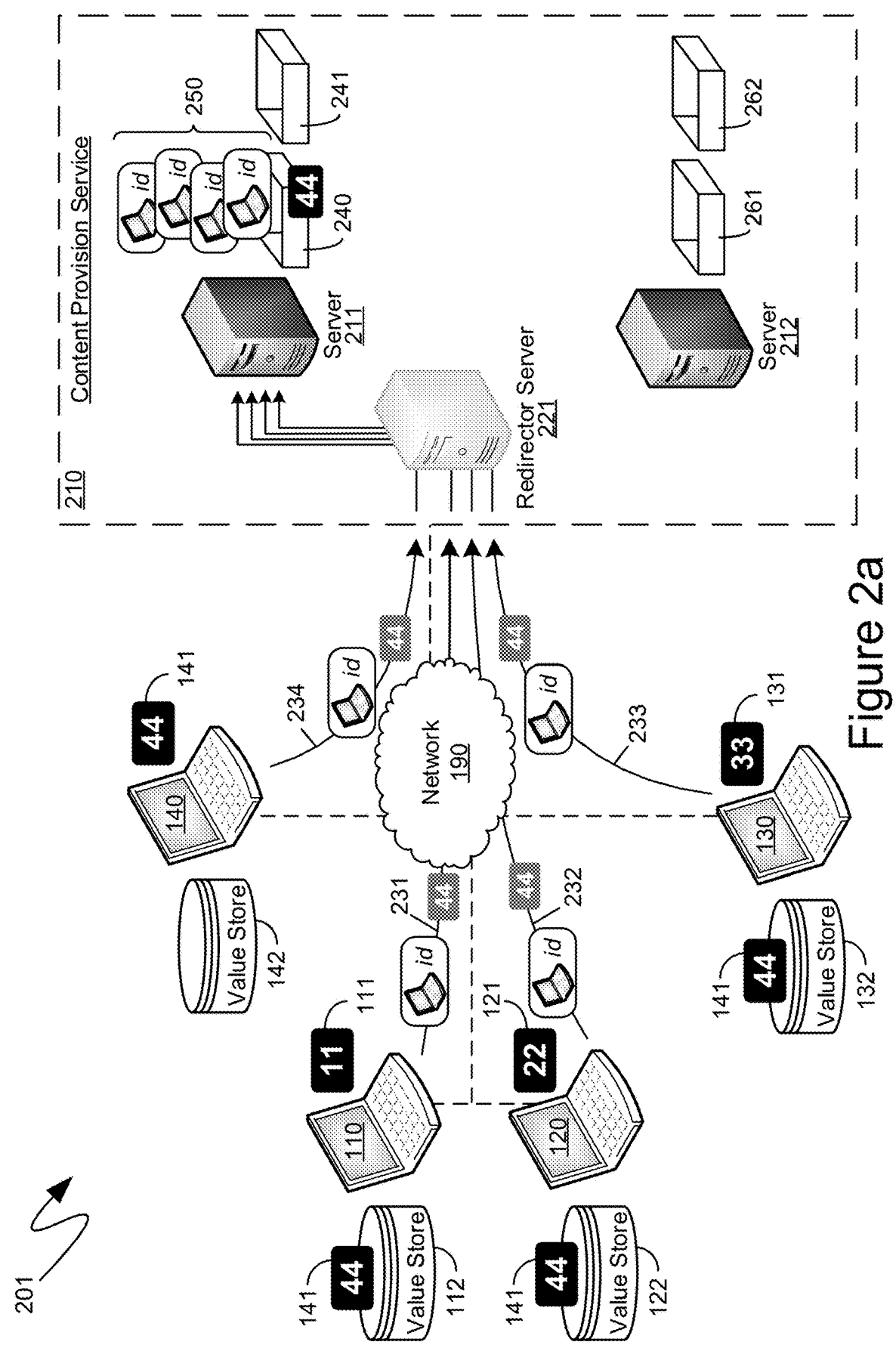
FIGS. 2a-2b are system diagrams of an exemplary system illustrating an exemplary peer identification of a self-organized group.

According to one aspect, the identification of the closest computing devices, by network proximity, can facilitate in the identification of peer computing devices which are more likely to be able to quickly and efficiently source digital content for download by other peer computing devices. Turning to FIG. 2a, the exemplary system 201 shown therein illustrates the exemplary computing devices 110, 120, 130 and 140, such as after the exchange of messages illustrated in FIGS. 1a-1d, now utilizing the information established with that exchange of messages to communicate with an external service, such as the exemplary external content provision service 210. For example, the exemplary computing device 110 can transmit a notification to the exemplary content provision service 210, such as the exemplary notification 231, providing an identification of the computing device 110 and an indication that the value 141 is associated with the computing device 110, such as by being retained in the value store 112 associated with the computing device 110. In a similar manner, the exemplary computing device 120 can transmit the exemplary notification 232 associating the computing device 120 with the value 141. The exemplary computing device can, likewise, transmit the exemplary notification 233 associating the computing device 130 with the value 141. The exemplary computing device 140 need not have a value retained in its value store 142, and, consequently, can transmit a notification 234 associating the computing device 140 with the value 141, which can be the internally generated value.

Within the exemplary content provision service 210, an optional redirector server 221 is illustrated. Such an optional redirector server can initially receive notifications, such as the exemplary notifications 231, 232, 233 and 234, and can, such as based on the values provided, determine to which of the servers of the content provision service 210, such as the exemplary servers 211 and 212, should the exemplary notifications 231, 232, 233 and 234 be redirected. For example, the optional redirector server 221 can hash the value 141, such as from the notification 231, and, based on such a hash, including being based on portions of the hash, such as the most significant, or least significant, digits, determine that the server 211 is an appropriate destination to which to redirect the notification 231. Analogous determinations can be made with respect to the remaining notifications 232, 233 and 234.

According to one aspect, the provided notifications can enable the content provision service 210, such as, more precisely, the exemplary server 211, to determine that each of the computing devices transmitting such notification, namely the exemplary computing devices 110, 120, 130 and 140, are to be grouped together into a single grouping of computing devices, such as the exemplary grouping 240. More specifically, exemplary server 211 can utilize the value, such as the exemplary value 141, provided with each of the notifications 231, 232, 233 and 234, to choose from among existing groupings, such as the exemplary groupings 240 and 241, being maintained by the exemplary server 211, or other groupings, such as a new grouping to be created by the exemplary server 211. For example, upon receiving the exemplary notification 231, the exemplary server 211 can create the grouping 240, which can comprise computing devices that provide the value 141 based on the message exchange detailed above. The exemplary server 211 can further associate exemplary computing device 110 with such a grouping 240. The subsequent receipt of notifications, such as the exemplary notifications 232, 233 and 234, can result in the exemplary server 211 associating the exemplary computing devices 120, 130 and 140 with the grouping 240. Thus, as illustrated by the exemplary system 201, the exemplary grouping 240 can comprise identifiers 250 identifying the exemplary computing devices 110, 120, 130 and 140 as all being part of the grouping 240.

Other server computing devices of the content provision service 210, such as the exemplary server 212, can maintain their own groupings, such as the exemplary groupings 261 and 262, and the redirector server 221 can redirect, to the server 212, notifications comprising values associated with the groupings maintained by the server 212.

Figure 2B:
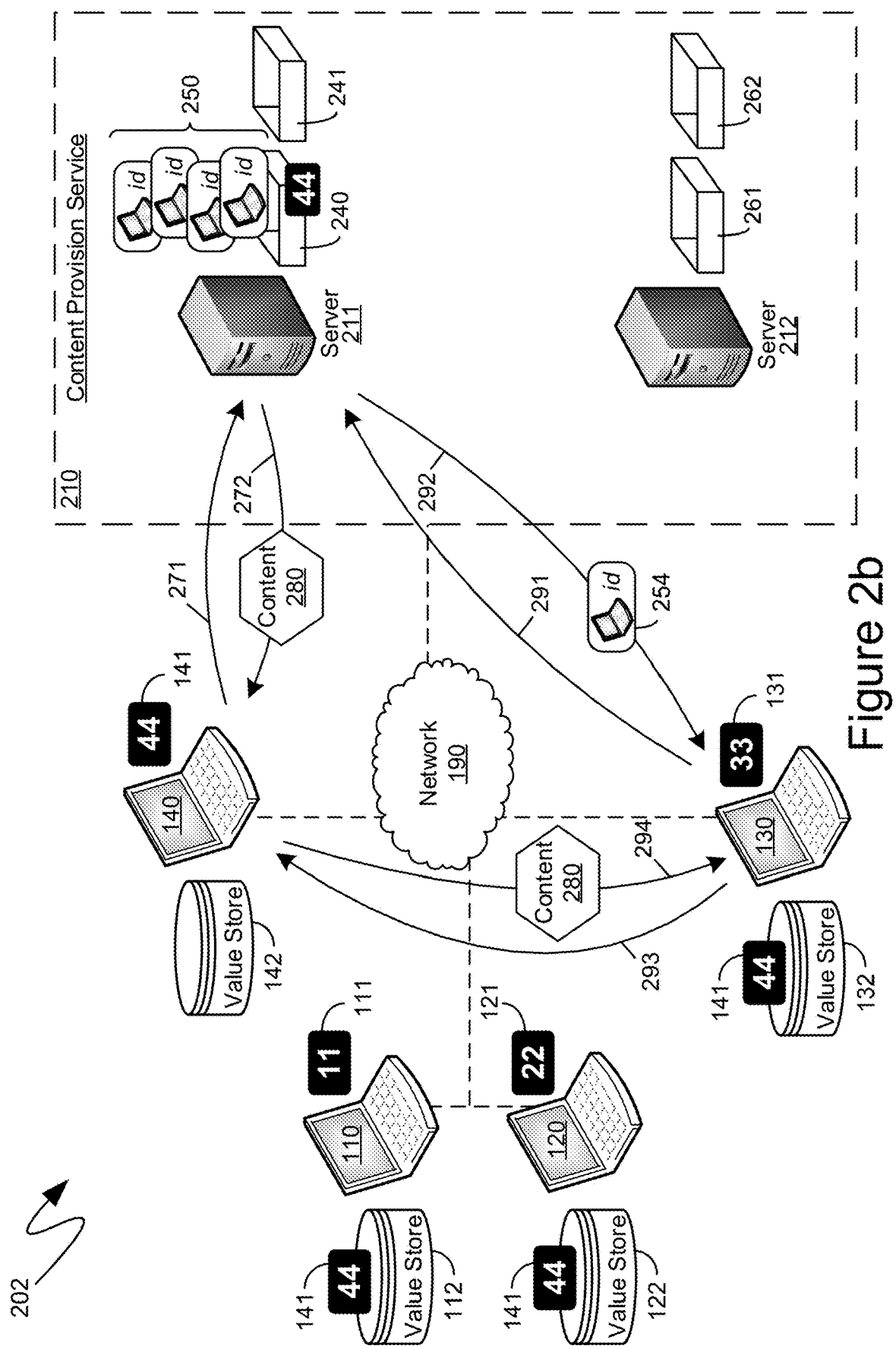

Such groupings can then be utilized, such as by the content provision service 210, to identify peers from which computing devices can obtain digital content more efficiently than obtaining the digital content directly from the content provision service 210, for example. Turning to FIG. 2b, the exemplary system 202 shown therein illustrates the utilization of the grouping generated in the manner illustrated by the exemplary system 201. More specifically, a computing device, such as the exemplary computing device 140, can issue a request 271 to the content provision service 210. While the exemplary request 271 is illustrated as being directed to the server 211, it can be directed to any server of the content provision service 210, as the provision of content can be independent of the grouping of computing devices. In response the request 271, content, such as the exemplary content 280, can be provided from the content provision service, to the requesting computing device 140, as illustrated by the communication 272. Because the content provision service 210 can be external to an internal network comprising the computing devices 110, 120, 130 and 140, for example, the delivery of the content 280, can be at a reduced rate than what could have been obtained had the computing device 140 obtained the content from one of the computing devices 110, 120 or 130.

Subsequently, another of the computing devices, such as the exemplary computing device 130, can issue a request, such as the exemplary request 291, for the same content 280. In response, according to one aspect, the content provision service 210 can determine that the computing device 130 is a peer of the computing device 140, such as based on the computing device identifiers 250 in the grouping 240. Since the exemplary content provision service 210 can have previously provided the content 280 to the exemplary computing device 140, instead of providing the content 280 a second time to the same intranet or subnetwork that comprises the computing devices 110, 120, 130 and 140, the exemplary content provision service 210 can, instead, return to the computing device 130 an identifier 254 identifying the computing device 140, such as is illustrated by the communication 292. The computing device 130 can then issue a request for the content 280, such as the exemplary request 293, to the computing device 140, and can obtain therefrom the content 280, as illustrated by the communication 294. Because the communication 294 can occur between computing devices that are close in network proximity, such as being on the same subnetwork, the transfer of the content 280 from the computing device 140 to the computing device 130 can be much faster than the transfer of the same content from the content provision service 210. Moreover, by obtaining the content 280 from a local computing device, such as the exemplary computing device 140, the intranet, or subnetwork, can reduce the quantity of digital content it transmits and/or receives from wide area networks, such as the Internet.

Figure 3A:
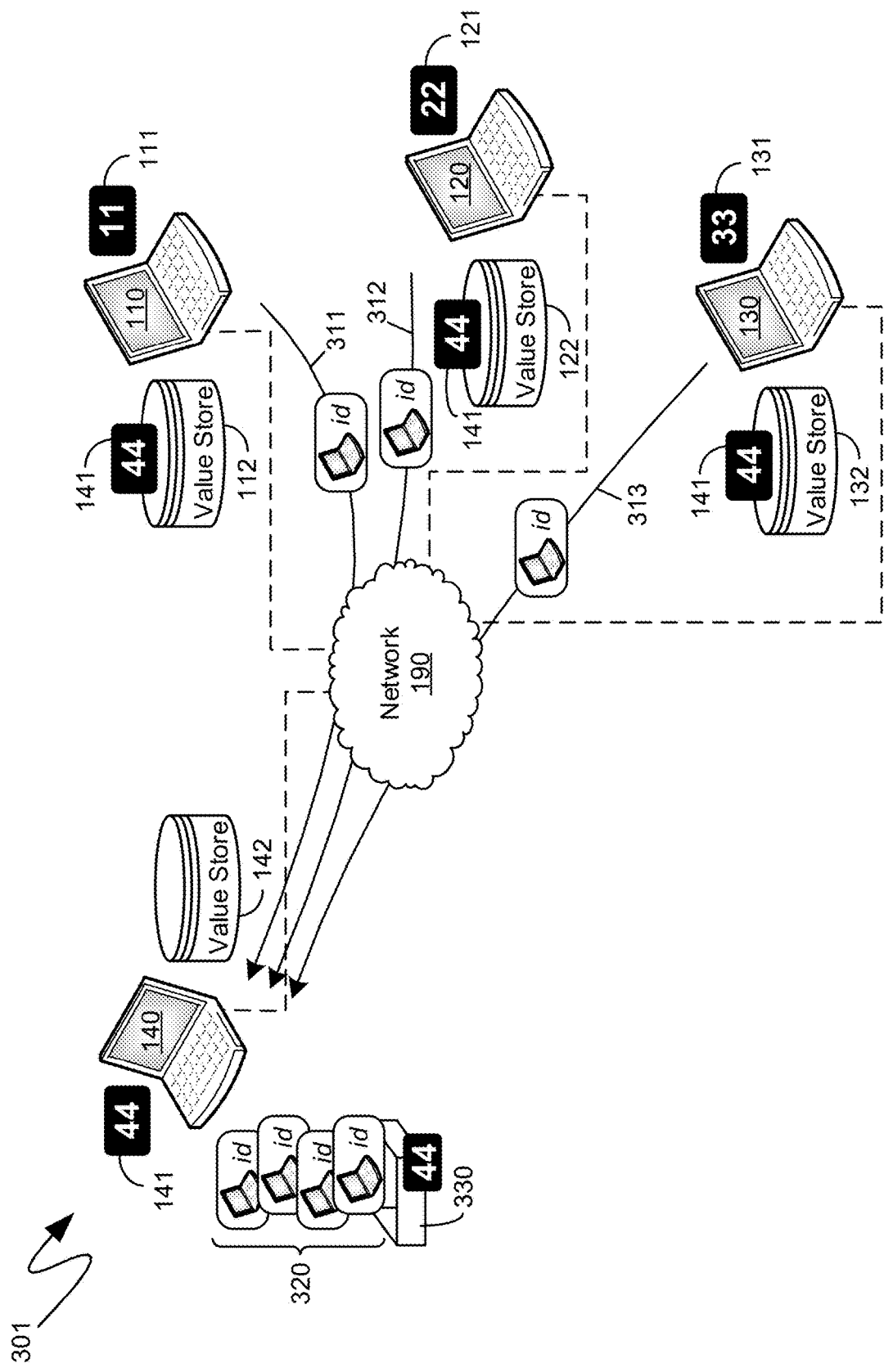
FIGS. 3a-3c are system diagrams of an exemplary system illustrating another exemplary peer identification of a self-organized group.

Although illustrated with reference to an external content provision service 210, according to one aspect, multiple computing devices can, in addition to exchanging the messages illustrated with reference to FIGS. 1a-1d, described in detail above, also self-identify their peers. More specifically, and with reference to FIG. 3a, the exemplary system 301 shown therein illustrates one mechanism by which self-identification of peers can be performed. A computing device, such as the exemplary computing device 140, can be selected to maintain a grouping of computing devices, such as the exemplary grouping 330, which can be analogous to the grouping 240 described above. According to one aspect, a computing device whose internally derived value was selected as greater than the other values internally derived by other computing devices of the group can be utilized as the computing device to maintain the grouping. Thus, for example, in response to subsequent broadcasts, such as the exemplary broadcast 146 shown in FIG. 1d, each of the other computing devices 110, 120 and 130 receiving such a broadcast can generate response notifications, such as the exemplary response notifications 311, 312 and 313, respectively, identifying the computing devices 110, 120 and 130, respectively, to the computing device 140.

Upon receiving the notifications 311, 312 and 313, the exemplary computing device 140 can create a grouping 330 and associate with the grouping the identifiers 320 of each of the computing devices 110, 120 and 130, which transmitted the notifications 311, 312 and 313, to the exemplary computing device 140, as well as an identifier of the computing device 140 itself. The utilization of such a grouping to identify peers can either be performed by the computing device 140 itself, or can individually be performed by the computing devices 110, 120 and 130.

Figure 3B:
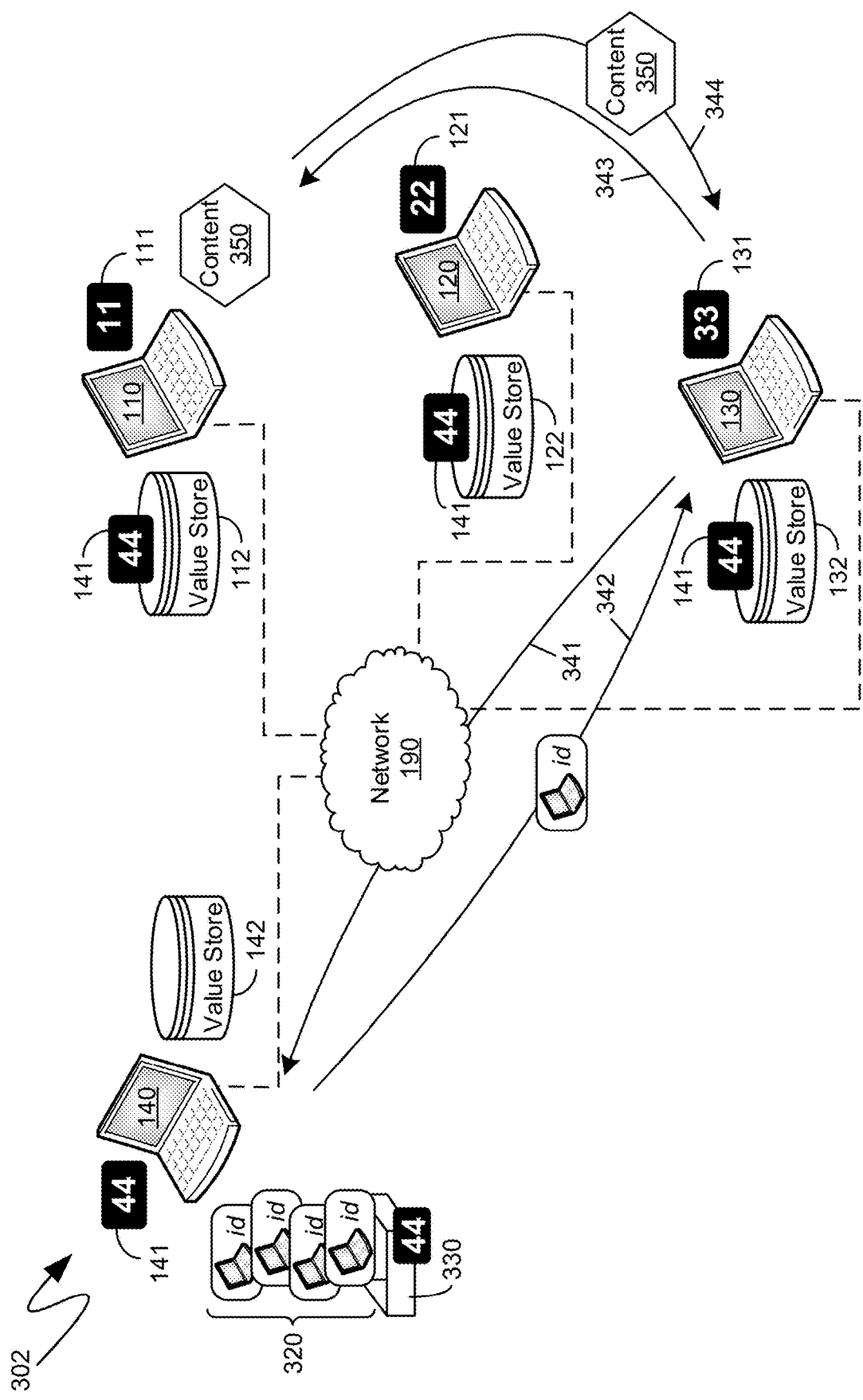

As to the former, turning to FIG. 3b, the exemplary system 302 shown therein illustrates one of the computing devices, such as the exemplary computing device 130, requesting, such as illustrated by the communication 341, the identification of a peer. For example, the computing device 130 can request, such as by the communication 341, an identification of all of the peers in the grouping 330, which can then be returned, from the exemplary computing device 140, via the communication 342. Upon receiving such identifications, the computing device 130 can communicate with each of the peers to determine whether any one or more of them has content that the computing device 130 seeks to download. For example, through such inter-peer communications, the computing device 130 can determine that the computing device 110 has the content 350 that the computing device 130 wishes to download. Consequently, the computing device 130 can issue a request 343, to the computing device 110, for the content 350, which can then be returned, from the computing device 110, as illustrated by the communication 344. Alternatively, the computing device 140 can be notified when one or more of peers downloads content, such as the exemplary content 350, and the request 341 can comprise an identification of the content 350, causing the computing device 140 to return a single identifier via the communication 342, namely an identifier of the computing device 110.

Figure 3C:
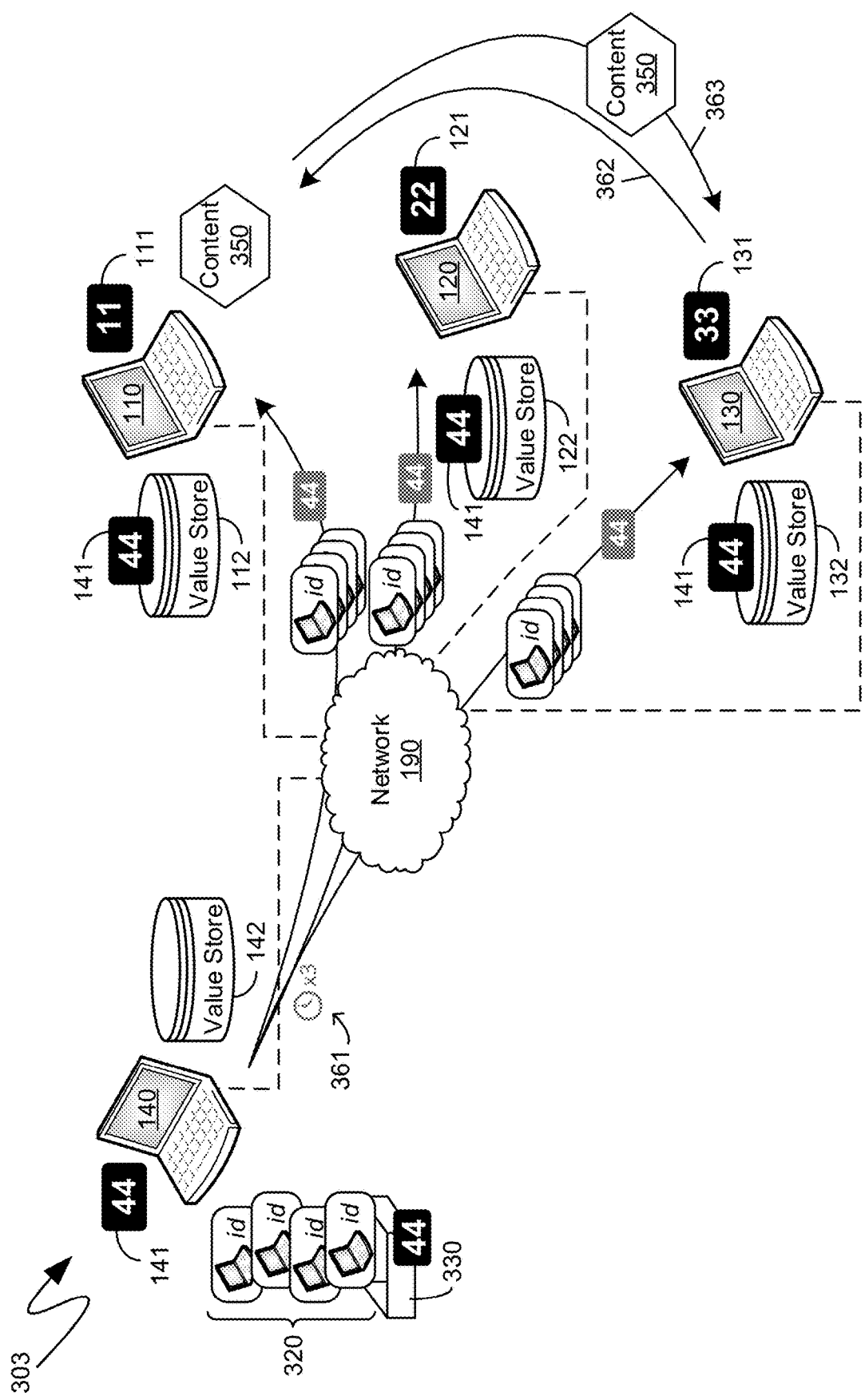

As to the latter, turning to FIG. 3c, the exemplary computing device 140, which can maintain the grouping 330, can periodically notify each of the peers in the grouping of the set of computing devices that are in the grouping. Thus, for example, as illustrated by the exemplary system 303 shown in FIG. 3, a periodic broadcast message, such as those detailed above, can be transmitted from the computing device 140 in the form of the broadcast message 361. As before, such a broadcast message can comprise the value 144. In addition, however, as illustrated by the exemplary system 303, the broadcast message 361 can further comprise identifiers of the computing devices in the grouping 330. In such a manner each of the other computing devices, such as the exemplary computing devices 110, 120 and 130, can be informed of the other computing devices within the group.

Subsequently, a computing device, such as the exemplary computing device 130, can communicate with each of the other identified peer computing devices to identify a peer computing device, such as the exemplary computing device 110, which can comprise content that the computing device 130 seeks to obtain, such as the exemplary content 350. The computing device 130 can then transmit a request 362 to the computing device 110 and can obtain therefrom, as illustrated by the communication 363, the content 350 without having to download the content 350 from an external service.

Although illustrated and described within the context of a single grouping, a single computing device can be a member of multiple groupings. For example, and turning to FIG. 4a, the exemplary system 401 shown therein illustrates the previously described computing devices 110, 120, 130 and 140, except now, also communicationally coupled to the network 190, can be computing devices 150 and 160. As before, a computing device can transmit a broadcast message, such as the exemplary broadcast message 410, broadcast by the exemplary computing device 160. Such a broadcast message, however, may only reach computing devices 150 and 130, such as is illustrated in the exemplary system 401. For example, as indicated previously, the design and set up of the underlying networking hardware may limit the reach of the broadcast message 410 to only the computing devices 150 and 130. As another example, as also indicated previously, the broadcast message 410 can specify a maximum quantity of hops after which the broadcast message is not retransmitted. Such a maximum quantity of hops can have enabled the broadcast message 410 to reach the computing devices 130 and 150, but not the computing devices 110, 120 or 140.

According to one aspect, the setting of a maximum quantity of hops can be informed by an existing quantity of computing devices within a grouping. More specifically, either an external service, such as that illustrated in FIGS. 2a-2b, or one of the local computing devices maintaining a grouping, such as that illustrated in FIGS. 3a-3c, can determine that an existing grouping comprises a greater quantity of computing devices than a threshold quantity. In such an instance, an instruction can be sent, either to the computing device currently periodically broadcasting messages, or to all of the computing devices within the grouping, that a fewer maximum quantity of hops is to be utilized for broadcast messages broadcasting the internally derived values of such computing devices, such as in the manner previously detailed. A fewer maximum quantity of hops can reduce the reach of the broadcast messages, thereby reducing a quantity of computing devices in the groupings.

An additional aspect of maximum hop quantity specification can utilize the hop-remaining metadata that can travel with the message, as indicated previously, to determine a distance of a receiving computing device from a transmitting computing device. For example, within the exemplary system 401 shown in FIG. 4a, if each of the computing devices was aware that broadcast messages were to be sent with a maximum of five hops, and the exemplary computing device 130 received the broadcast message 410 with hop metadata indicating that three hops remained, the exemplary computing device 130 can determine that it is only two hops away from the broadcasting computing device, such as, for example, the computing device 160. Such information can then be provided, such as to the external service, in the manner illustrated in FIGS. 2a-2b, for example, and described in detail above, or to one of the local computing devices, as another example, such as in the manner illustrated in FIGS. 3a-3c, and described in detail above. The selection of the peer computing device can then be informed by a known hop distance, with peers determined to be a lesser quantity of hops away being preferred over peers that are determined to be a greater quantity hops away from a requesting computing device.

Figure 4A:
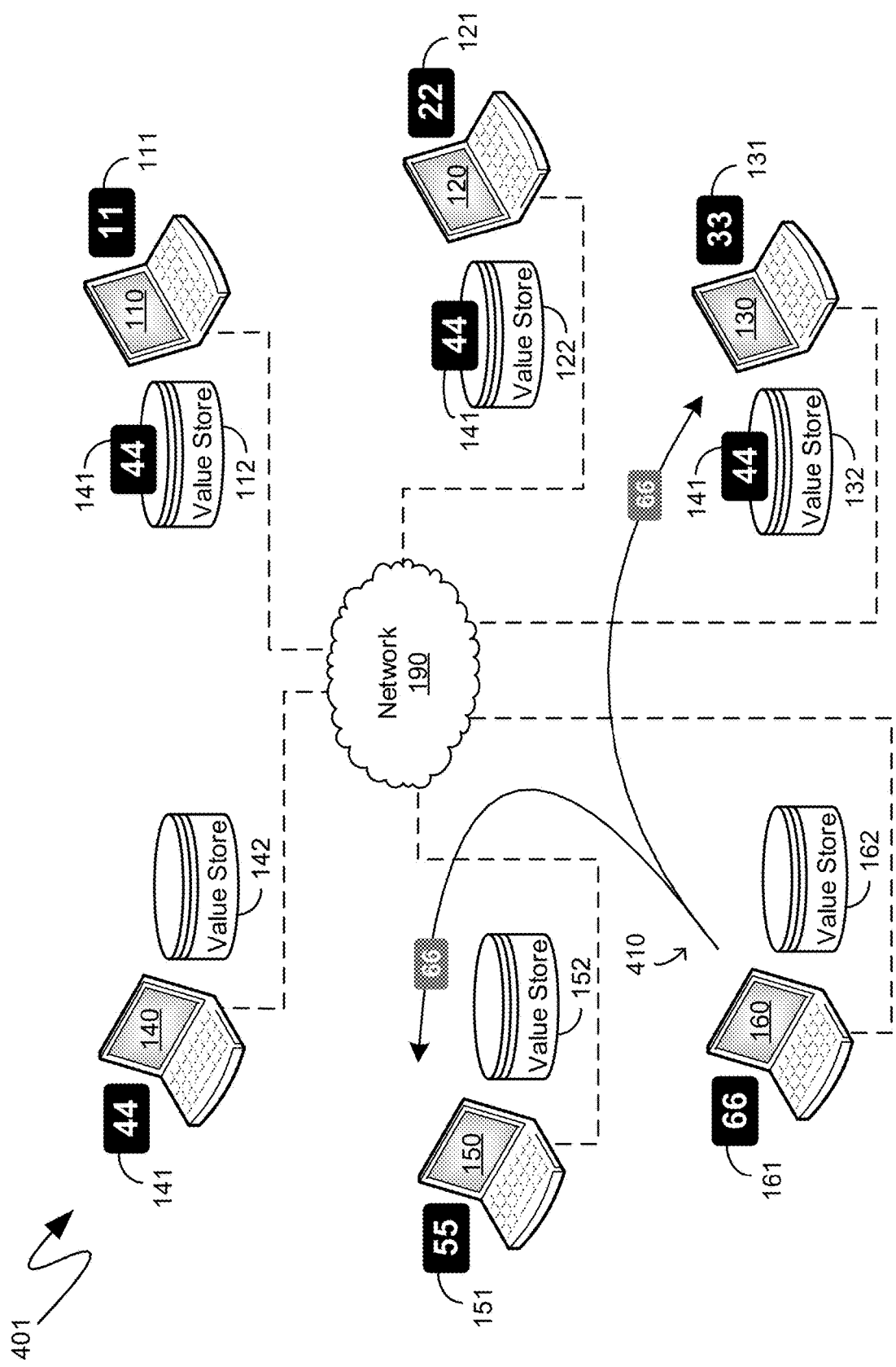
FIGS. 4a-4b are system diagrams of an exemplary system illustrating another exemplary message exchange for self-organization.
Figure 4B:
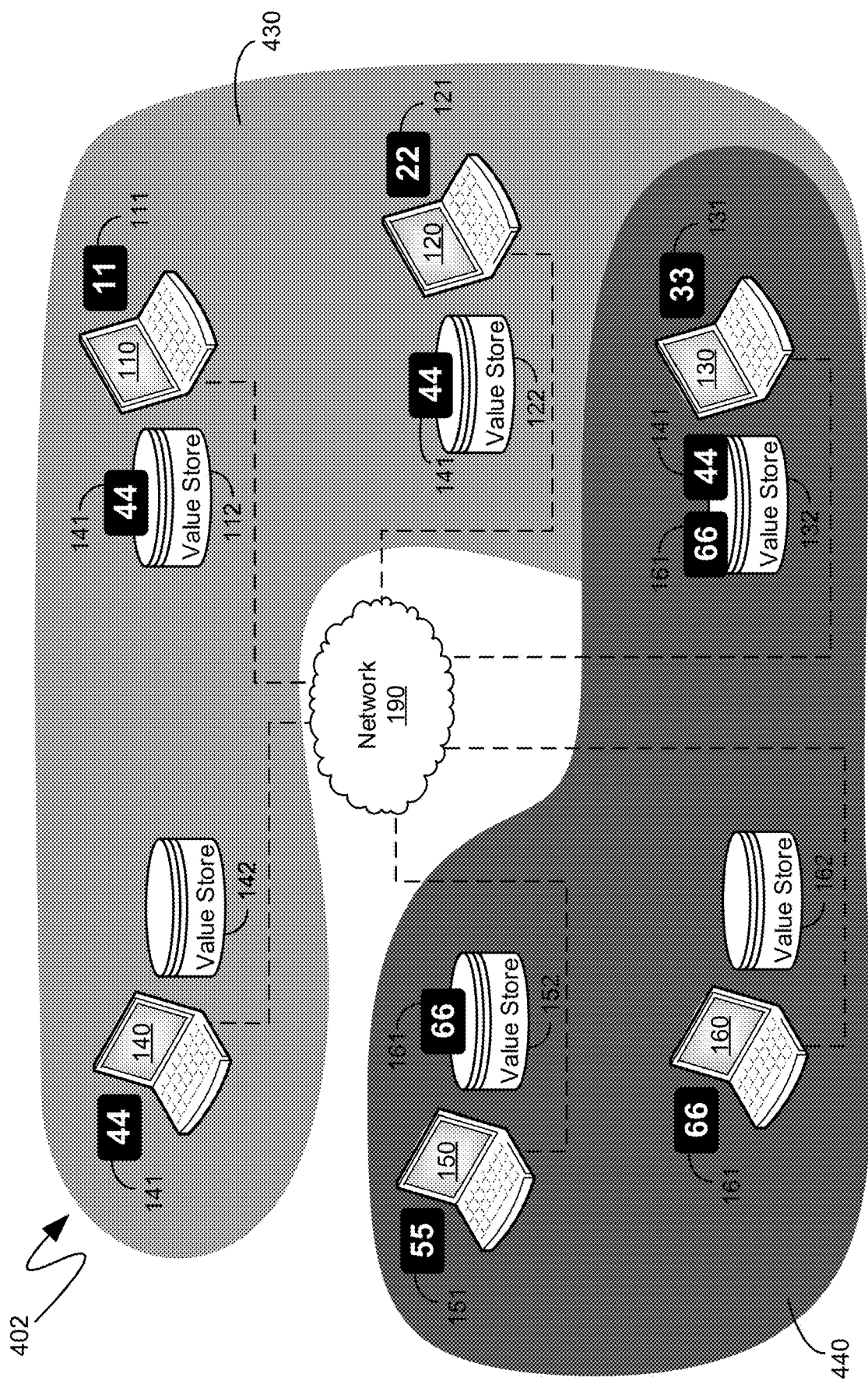

Returning back to the exemplary system 401, shown in FIG. 4a, in response to the receipt of the broadcast message 410, each of the computing devices 130 and 150 can, such as in a manner detailed above, compare the value received with the broadcast message 410, namely the value 161, to internally derived values such as, for example, the values 131 and 151, respectively. Moreover, as also detailed above, if the received value 161 is greater than the internally derived value, such a received value can be retained in the value store associated with the receiving computing device. As can be seen, both the computing devices 150 and 130 can determine that the received value 161 is greater than the internally derived values 151 and 131, respectively. As such, and turning to FIG. 4b, the exemplary system 402 shown therein illustrates the retaining of the value 161 in the value store 152, associated with the computing device 150, and in the value store 132, associated with the computing device 130.

As can be seen, the retaining of the value 161 in the value store 132 does not impact the retaining of the value 141 in the value store 132. More specifically, exemplary computing device 140 can continue to broadcast the value 141, since the computing device 140 is not aware of the computing device 160. Similarly, the exemplary computing device 160 can continue to broadcast the value 161, since the computing device 160 is not aware of the computing device 140. Accordingly, a computing device that receives both broadcasts, such as, for example, the exemplary computing device 130, can retain both the value 141 and the value 161 in the value store 132, and can generate notifications associating the computing device 130 with both values. As in result, the exemplary computing device 130 can be grouped into multiple groupings. For example, the computing device 130 can be part of the exemplary grouping 430 illustrated with lighter shading in FIG. 4b and can also be part of the exemplary grouping 440 illustrated with darker shading in FIG. 4b.

Figure 5:
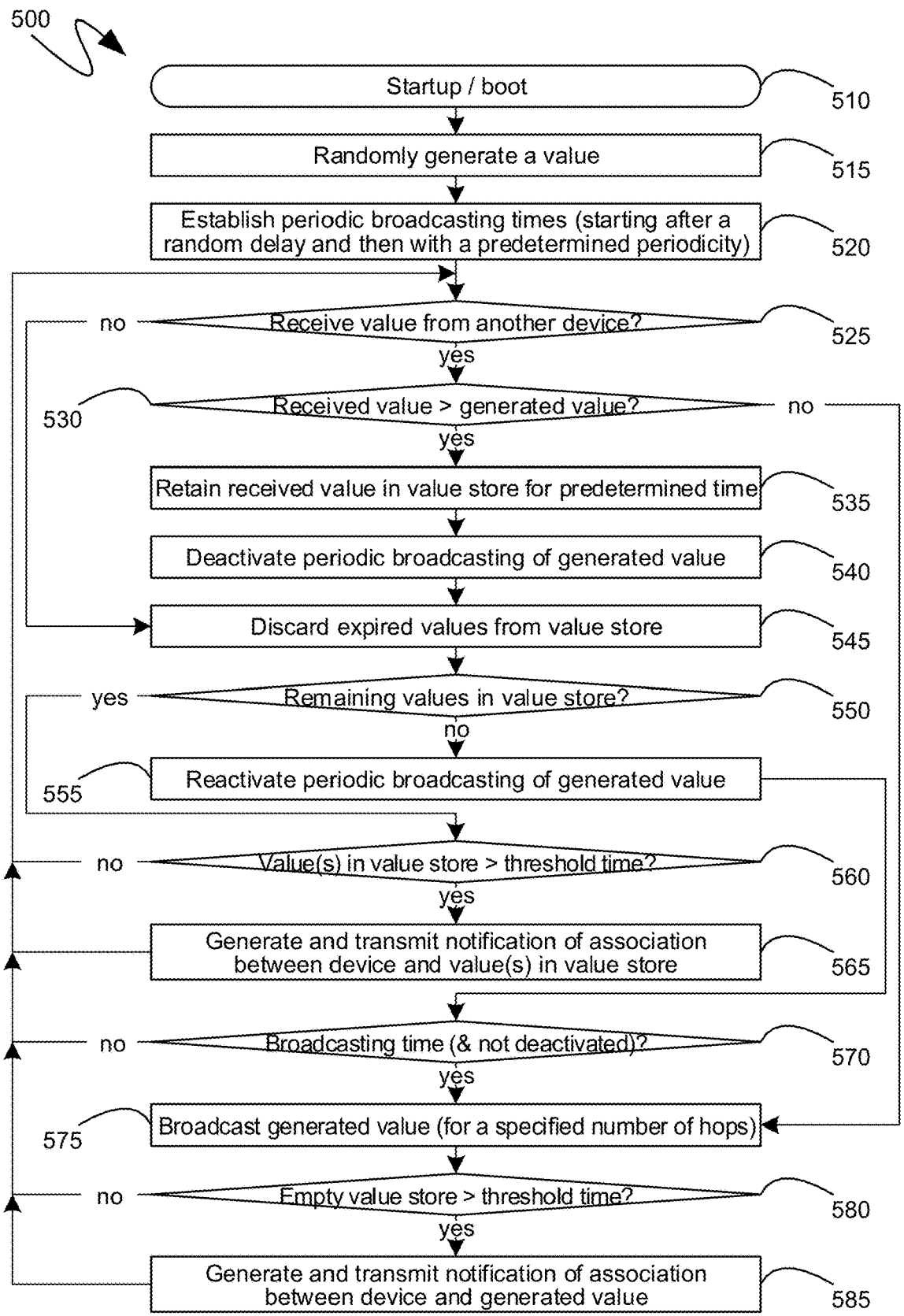
FIG. 5 is a flow diagram of an exemplary series of steps by which message-limited self-organization can be performed.

Turning to FIG. 5, the exemplary flow diagram 500 shown therein illustrates an exemplary series of steps that can be performed by individual computing devices, which can, when separately and individually performed, provide the system functionality illustrated and described in detail above. Initially, at step 510, a triggering event can occur which can act as an anchor from which broadcasting times can be determined for purposes of staggering, and otherwise temporarily spreading out, the transmission of broadcast messages. Such a triggering event, at step 510, can be a startup of the computing device executing the steps of the exemplary flow diagram 500, a boot of an operating system of such a computing device, a startup of one or more hardware subsystems, such as the networking subsystem, one or more application programs, or other like startup or boot triggers. Subsequently, at step 515, an internal value can be generated as detailed above, such a value can be randomly generated, including random generations utilizing seed data from identifiers associated with the computing device, such as network identifiers, computing device identifiers, hardware identifiers and the like. Alternatively, or in addition, the value generated at step 515 can be derived from, or can be a portion of, or a whole of, one or more such values. At step 520, predetermined broadcasting times can be established. As detailed above, such broadcasting times can indicate when a computing device will transmit a broadcast message comprising the value generated at step 515 unless, such as for the reasons detailed above, and which will be further indicated below within the context of the exemplary flow diagram 500, such broadcasts are not to be sent. The broadcasting times established at step 520 can include periodic broadcasts that repeat on a predetermined periodicity so that other computing devices continue to retain the broadcast value in their value stores, and the retention of such a value does not expire. Additionally, the broadcasting times established at step 520 can include an initial broadcasting time, which can be based on the triggering event at step 510, such as being a random delay after the triggering event of step 510.

At step 525, a determination can be made whether any broadcast messages, comprising values from other computing devices, have been received. If such a message has been received, then processing can proceed to step 530 and the received value can be compared with the value generated at step 515. If the value received at step 525 is greater than the value generated at step 515, processing can proceed to step 535, and the received value can be retained in a value store for a predetermined amount of time. As indicated previously, the quantity of time for which a value can be retained in a value store can be based on a periodicity of broadcasting times, such as established at step 520. For example, a value can be retained, at step 535, for a sufficient amount of time that at least one periodic rebroadcast can be received. As another example, a value can be retained for a sufficient amount of time that at least two or more periodic broadcasts can be received, thereby accommodating transmission failures, receive failures and other like failures that can prevent the receipt of one or more periodic broadcasts.

At step 540, as a consequence of the determination at step 530 that the received values is greater than the generated value, the periodic broadcasting of the generated value can be deactivated. Processing can then proceed with step 545. Although illustrated in as an explicit step, step 545, in which expired values are removed from the value store, can happen automatically upon the expiration of the relevant time, and need not be triggered by a precondition event (other than, of course, the expiration of the relevant time). Returning back to step 525, if, at step 525, no broadcast message is received, then processing can proceed directly to step 545. Subsequently, at step 550, a determination can be made as to whether any remaining values continue to be retained in the value store. If, at step 550, it is determined that no such values remain, then the value generated at step 515 can, at that point in time, be a greatest value of which the computing device, executing the steps of the exemplary flow diagram 500, is aware. Accordingly, at step 555, the periodic broadcasting of the value generated at step 515 can be reactivated.

Returning back to step 550, if values remain retained in the value store, then processing can proceed to step 560, in which a determination is made as to whether the values in the value store have been retained for greater than a threshold amount of time. More specifically, to avoid constantly generating and transmitting notifications, according to one aspect, a notification, associating the computing device executing the steps of the exemplary flow diagram 500 with a value, can be generated only after the value has been associated with the computing device for a threshold amount of time. Thus, if the values in the value store have not been retained for greater than a threshold amount of time, processing can return to step 525, detailed above. Conversely, if, at step 560, it is determined the values retained in the value store have been retained for greater than a threshold amount of time, processing can proceed to step 565 and the notification can be generated and transmitted that associates the computing device performing the steps of the exemplary flow diagram 500 with the relevant values retained in the value store. As indicated previously, such notification can be transmitted to another local computing device, or to an external service. Processing can then return to step 525.

Returning back to step 555, subsequent to the reactivation of periodic broadcasting of the generated value, such as in response the preconditions detailed above, a determination can be made, at step 570, as to whether a broadcasting time has been reached. If, at step 570, it is determined that a broadcasting time has occurred, and broadcasts are not otherwise deactivated, then processing can proceed to step 575 and the value generated at step 515 can be broadcast. As indicated previously, the broadcasting of such a value can specify a maximum number of hops across which such a broadcast will extend. Returning back to step 530, as shown by the exemplary flow diagram 500 of FIG. 5, if, at step 530, the computing device determines that the received value is not greater than the generated value, but is, instead, less than the generated value, then such a determination can trigger the broadcasting, such as at step 575, without the broadcasting time having been reached, such as at step 570.

Once the computing device broadcasts the generated value, such as at step 575, processing can proceed to step 580, where determination can be made that the value store has been empty for greater than a threshold quantity of time which, according to one aspect, can be the same threshold quantity of time utilized at step 560. If the value store has not been empty for a sufficiently long period of time, as determined at step 580, processing can return to step 525. By contrast, if the value store has been empty for a sufficiently long period of time, a notification comprising an association between the computing device executing the steps of the exemplary flow diagram 500 and the value generated at step 515 can be generated at step 585. As indicated previously, such notification can be transmitted to an external service, or an internal computing device which can be part of the same group as the computing device executing the steps of the exemplary flow diagram 500. Processing can then return step 525 and proceed in the manner detailed above.

Figure 6:
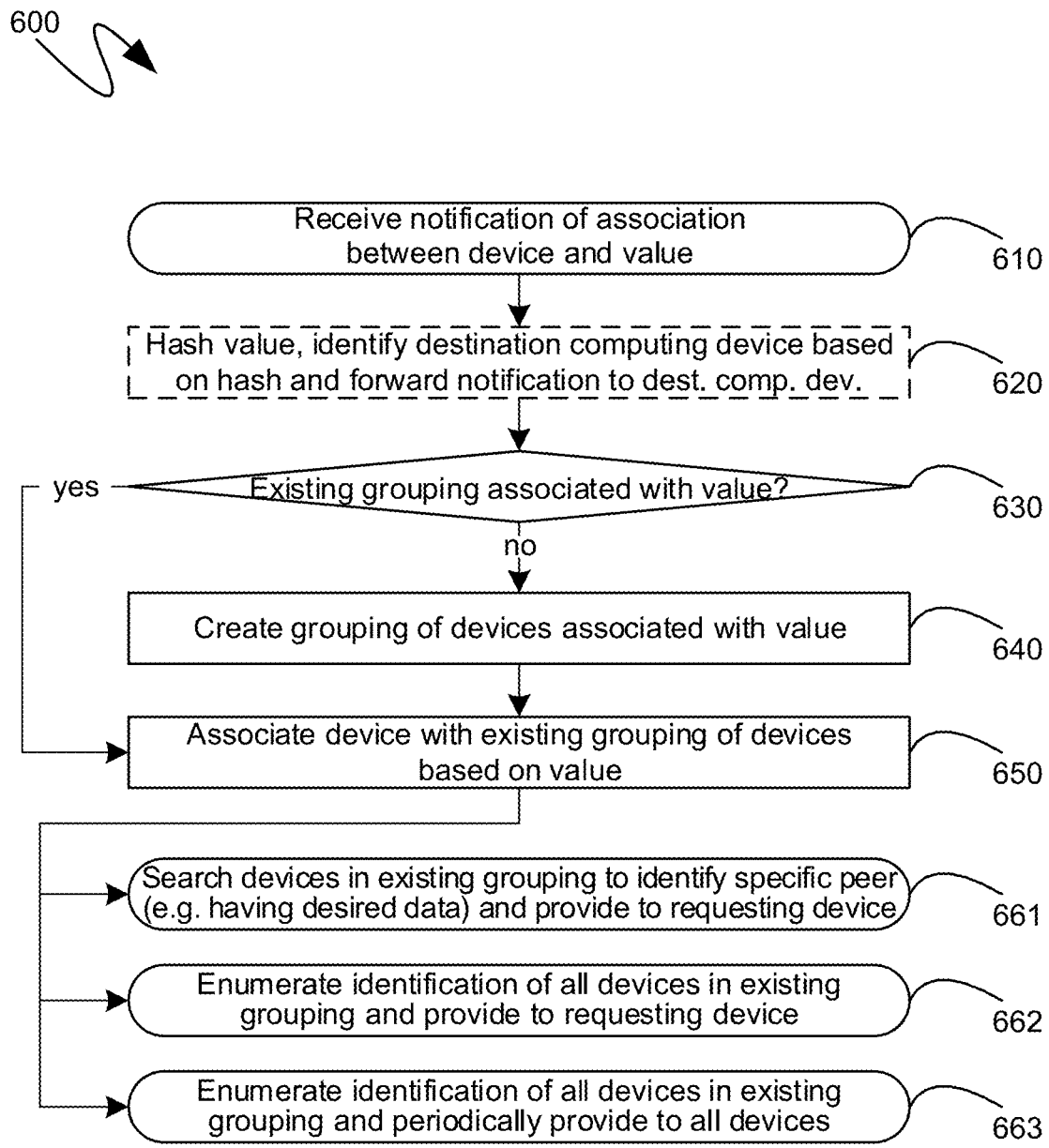
FIG. 6 is a flow diagram of an exemplary series of steps by which peer identification within a self-organized group can be performed.

Turning to FIG. 6, the exemplary flow diagram 600 shown therein illustrates an exemplary series of steps that can be performed by computing devices of an external service, such as a content delivery service, or one of the internal computing devices of the group of computing devices identified using the above described mechanisms. The steps of the exemplary flow diagram 600 illustrate an exemplary utilization of the grouping of computing devices to identify peer computing devices, such as to facilitate peer-to-peer transfers of digital content, thereby avoiding the downloading of digital content from external sources. Initially, at step 610, a notification can be received from a computing device associating that computing device with a value that can have been derived utilizing the above described mechanisms. At step 620, an optional step of utilizing the value to identify a computing device to which to redirect the notification, received at step 610, can be performed. As indicated previously, such an identification can be based on a hash of the value, or other like identification mechanism.

At step 630, a determination can be made as to whether a grouping associated with the value received in the notification at step 610 already exists. If such a grouping already exists, then, at step 650, the computing device transmitting the notification received at step 610 can be associated with such an existing grouping of devices. Conversely, if, at step 630, it is determined that no such association exists, processing can first proceed to step 640, where a grouping of devices associated with the value can be created. Processing can then proceed to step 650 and associate the device transmitting the notification received at step 610 with the newly created grouping of devices.

As indicated previously, once a grouping of devices has been created, the grouping can be referenced to identify peers. For example, such as in step 661, devices in an existing grouping can be searched to identify a specific peer, which can then be provided to the requesting device. More specifically, if the requesting device is seeking specific digital content, then a peer of such a device, as identified from an existing grouping, that has already obtained such digital content, can be determined, and the identification of such a peer can be provided. As another example, such as at step 662, an enumeration of all of the devices in an existing grouping can be provided to one or more peers of such a grouping in response to an explicit request. As yet another example, such as at step 663, the enumeration of all of the devices in the existing grouping can be periodically provided in a proactive manner, without being triggered by an explicit request.

Figure 7:
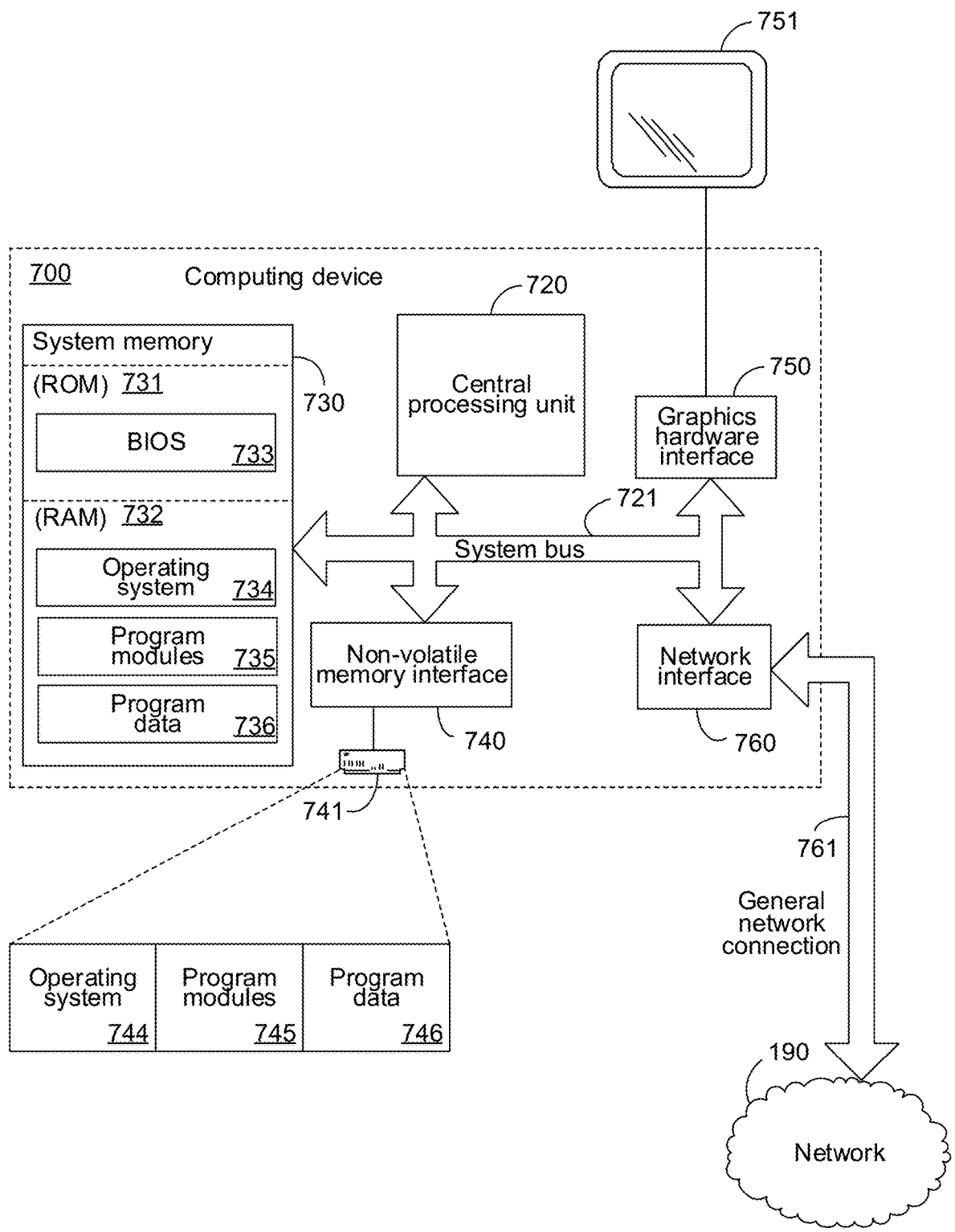
FIG. 7 is a block diagram of an exemplary computing device performing message-limiting self-organization and/or peer identification within a self-organized group.

Turning to FIG. 7, an exemplary computing device 700 is illustrated which can perform some or all of the mechanisms and actions described above. The exemplary computing device 700 can include, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 750 and a display device 751, which can include display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 746. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 761 through a network interface or adapter 760, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 761. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a system comprising: a first server computing device comprising: one or more first server processing units; and one or more first server computer-readable media comprising computer-executable instructions which, when executed by the one or more first server processing units, cause the first server computing device to: receive a first communication from a first client computing device, the first communication comprising a first value; receive a second communication from a second client computing device, the second communication also comprising the first value; associate both the first and second client computing devices with a first grouping of client computing devices based on both the first and second client computing devices transmitting the first value; receive a request from the first client computing device for a first data;
search the first grouping of client computing devices for a computing device already having received the first data; and transmit, to the first client computing device, in response to the request, an identification of the second client computing device as a source from which the first client computing device is to obtain the first data; wherein the first and second client computing devices each independently retain the first value by independently performing steps comprising: generate a first random value; receive a second random value that was broadcast by another computing device; retain the second random value in a value store in response to determining that the second random value is greater than the first random value; discard the second random value from the value store in response to the receiving the second random value having last occurred more than a first predetermined amount of time ago; broadcast the first random value in response to: (1) a broadcasting time occurring and (2) no greater value being retained in the value store at the broadcasting time; and not broadcast the first random value, despite the broadcasting time occurring, in response to a greater value being retained in the value store at the broadcast time.

A second example is the system of the first example, further comprising: a second server computing device comprising: one or more second server processing units; and one or more second server computer-readable media comprising computer-executable instructions which, when executed by the one or more second server processing units, cause the second server computing device to: initially receive the first communication from the first client computing device; and redirect the first communication to the first server computing device based on the first value.

A third example is the system of the first example, wherein the one or more first server computer-readable media comprise further computer-executable instructions which, when executed by the one or more first server processing units, cause the first server computing device to: determine that a quantity of client computing devices associated with the first grouping of client computing devices exceeds a threshold; and in response to the determining, instructing at least some of the client computing devices associated with the first grouping of client computing devices to reduce a hop quantity threshold in their broadcasting of random values.

A fourth example is a computing device comprising: one or more processing units; and one or more computer-readable media comprising computer-executable instructions which, when executed by the one or more processing units, cause the computing device to: randomly generate a first value; receive a second value that was broadcast by a second computing device; retain the second value in a value store in response to determining that the second value is greater than the first value; discard the second value from the value store in response to the receiving the second value having last occurred more than a first predetermined amount of time ago; broadcast the first value in response to: (1) a broadcasting time occurring and (2) no greater value being retained in the value store at the broadcasting time; not broadcast the first value, despite the broadcasting time occurring, in response to a greater value being retained in the value store at the broadcast time; and generate a notification of an association between the computing device and at least one of: the first value based on no value being retained in the value store or the second value based on the second value being retained in the value store.

A fifth example is the computing device of the fourth example, wherein the receipt of the second value triggers the occurrence of the broadcast time in response to determining that the second value is less than the first value.

A sixth example is the computing device of the fourth example, wherein the broadcast time occurs with a predetermined periodicity starting with an initial broadcast time, the predetermined periodicity being less than the first predetermined amount of time.

A seventh example is the computing device of the sixth example, wherein the computer-readable media comprise further computer-executable instructions, which, when executed by the one or more processing units cause the computing device to: randomly select a first amount of delay time that is greater than the predetermined periodicity; and set the initial broadcast time to be the first amount of delay time after a boot of the first computing device.

An eighth example is the computing device of the fourth example, wherein the computer-readable media comprise further computer-executable instructions, which, when executed by the one or more processing units cause the computing device to: receive a third value from a third computing device; retain the third value in the value store in response to determining that the third value is greater than the first value; and discard the third value from the value store in response to the receiving the third value having last occurred more than the first predetermined quantity of time ago; wherein the retaining and the discarding of the third value is independent of the retaining and the discarding of the second value.

A ninth example the computing device of the fourth example, wherein the computer-readable media comprise further computer-executable instructions, which, when executed by the one or more processing units cause the computing device to: transmit the notification to an external service; and receive, from the external service, an identification of a peer of the first computing device, the peer having been identified based on the association.

A tenth example is the computing device of the ninth example, wherein the transmission of the notification to the external service is repeated with a predetermined periodicity.

An eleventh example is the computing device of the fourth example, wherein the computer-readable media comprise further computer-executable instructions, which, when executed by the one or more processing units cause the computing device to: transmit the notification to the second computing device based on the second value being retained in the value store; and receive, from the second computing device, an identification of a peer of the first computing device.

A twelfth example is the computing device of the fourth example, wherein the association between the computing device and the second value is based on the second value being retained in the value store for more than second predetermined amount of time, the second predetermined amount of time being at least twice as long as the first predetermined amount of time.

A thirteenth example is the computing device of the fourth example, wherein the computer-executable instructions causing the computing device to generate the notification further comprise computer-executable instructions, which, when executed, cause the computing device to generate the notification of the association between the computing device and both the second value and a third value based on both the second and third values being simultaneously retained in the value store.

A fourteenth example is the computing device of the fourth example, wherein the computer-executable instructions causing the computing device to broadcast the first value further comprise computer-executable instructions, which, when executed, cause the computing device to specify a maximum quantity of hops for the broadcasting of the first value.

A fifteenth example is the computing device of the fourteenth example, wherein the one or more computer-readable media comprise further computer-executable instructions, which, when executed by the one or more processing units, cause the computing device to: determine a distance between the computing device and the second computing device based on a difference between the maximum quantity of hops and a quantity of hops remaining associated with the receipt of the second value that was broadcast by the second computing device; and wherein the notification of the association between the computing device with the second value further comprises an indication of the determined distance between the computing device and the second computing device.

A sixteenth example is a method of automatically grouping computing devices based on network proximity, the method comprising: randomly generating a first value at a first computing device; randomly generating a second value at a second computing device; periodically broadcasting the first value from the first computing device; retaining, in a value store of the second computing device, the first value and preventing initiation of periodic broadcasts of the second value from the second computing device in response to determining, at the second computing device, that the first value is greater than the second value; commencing periodic broadcasts of the second value from the second computing device in response to determining, at the second computing device, that the first value is less than the second value; and retaining, in a value store of the first computing device, the second value and terminating the periodic broadcasting of the first value from the first computing device in response to determining, at the first computing device, that the first value is less than the second value.

A seventeenth example is the method of the sixteenth example, further comprising: randomly generating a third value at a third computing device; commencing periodic broadcasts of the third value from the third computing device in response to determining, at the third computing device, that the first value is less than the third value; retaining, in the value store of the first computing device, the third value in response to determining, at the first computing device, that the first value is less than the third value, wherein the value store of the first computing device already has retained therein the second value in response to the prior determination, at the first computing device, that the first value is less than the second value; retaining, in the value store of the second computing device, the third value and terminating the periodic broadcasts of the second value from the second computing device in response to determining, at the second computing device, that the second value is less than the third value; and no longer retaining the second value in the value store of the first computing device in response to no longer receiving, at the first computing device, the second value due to the termination of the periodic broadcasts of the second value from the second computing device.

An eighteenth example is the method of the sixteenth example, further comprising: randomly generating a third value at a third computing device; commencing periodic broadcasts of the third value from the third computing device in response to determining, at the third computing device, that the first value is less than the third value; and retaining, in the value store of the first computing device, the third value in response to determining, at the first computing device, that the first value is less than the third value, wherein the value store of the first computing device already has retained therein the second value in response to the prior determination, at the first computing device, that the first value is less than the second value; wherein the periodic broadcasts of the third value do not reach the second computing device; and wherein further the first computing device continues to retain, in the value store of the first computing device, both the second and third values due to the first computing device continuing to receive both the periodic broadcasts of the second value from the second computing device and the periodic broadcasts of the second value from the second computing device.

A nineteenth example the method of the eighteenth example, further comprising: setting a maximum quantity of hops of the broadcasting of the first value to a first maximum quantity; setting a maximum quantity of hops of the broadcasting of the second value to the first maximum quantity; and setting a maximum quantity of hops of the broadcasting of the third value to a second maximum quantity differing from the first maximum quantity.

A twentieth example is the method of the sixteenth example, further comprising: transmitting, from the second computing device, to the first computing device, a notification associating the second computing device with the first value in response to determining, at the second computing device, that the first value is greater than the second value; associating, at the first computing device, both the first and second computing devices with a first group of computing devices based on receiving the notification associating the second computing device with the first value; transmitting, from the first computing device, to the second computing device, a notification associating the first computing device with the second value in response to determining, at the first computing device, that the first value is less than the second value; and associating, at the second computing device, both the first and second computing devices with the first group of computing devices based on receiving the notification associating the first computing device with the second value.

As can be seen from the above descriptions, mechanisms for self-organizing network groups utilizing a reduced quantity of messages have been presented. In view of the many possible variations of the subject matter described herein, we claim as our invention all such embodiments as may come within the scope of the following claims and equivalents thereto.

We claim:

1. A system comprising:
   a first server computing device comprising:
      one or more first server processing units; and
      one or more first server computer storage media comprising computer-executable instructions which, when executed by the one or more first server processing units, cause the first server computing device to:
         receive a first communication from a first client computing device, the first communication comprising a first value;
         receive a second communication from a second client computing device, the second communication also comprising the first value;
         associate both the first and second client computing devices with a first grouping of client computing devices based on both the first and second client computing devices transmitting the first value;
         receive a request from the first client computing device for a first data;
      search the first grouping of client computing devices for a computing device already having received the first data; and
      transmit, to the first client computing device, in response to the request, an identification of the second client computing device as a source from which the first client computing device is to obtain the first data;
      wherein the first and second client computing devices each independently retain the first value by independently performing steps comprising:
         generate a first random value;
         receive a second random value that was broadcast by another computing device;
         retain the second random value in a value store in response to determining that the second random value is greater than the first random value;
         discard the second random value from the value store in response to the receiving the second random value having last occurred more than a first predetermined amount of time ago;
         broadcast the first random value in response to: (1) a broadcasting time occurring and (2) no greater value being retained in the value store at the broadcasting time; and
         not broadcast the first random value, despite the broadcasting time occurring, in response to a greater value being retained in the value store at the broadcast time.

2. The system of claim 1, further comprising:
   a second server computing device comprising:
      one or more second server processing units; and
      one or more second server computer storage media comprising computer-executable instructions which, when executed by the one or more second server processing units, cause the second server computing device to:
         initially receive the first communication from the first client computing device; and
         redirect the first communication to the first server computing device based on the first value.

3. The system of claim 1, wherein the one or more first server computer storage media comprise further computer-executable instructions which, when executed by the one or more first server processing units, cause the first server computing device to:
   determine that a quantity of client computing devices associated with the first grouping of client computing devices exceeds a threshold; and
   in response to the determining, instructing at least some of the client computing devices associated with the first grouping of client computing devices to reduce a hop quantity threshold in their broadcasting of random values.

4. A computing device comprising:
   one or more processing units; and
   one or more computer storage media comprising computer-executable instructions which, when executed by the one or more processing units, cause the computing device to:
      randomly generate a first value;
      receive a second value that was broadcast by a second computing device;
      retain the second value in a value store in response to determining that the second value is greater than the first value;
      discard the second value from the value store in response to the receiving the second value having last occurred more than a first predetermined amount of time ago;
      broadcast the first value in response to: (1) a broadcasting time occurring and (2) no greater value being retained in the value store at the broadcasting time;
      not broadcast the first value, despite the broadcasting time occurring, in response to a greater value being retained in the value store at the broadcast time; and
      generate a notification of an association between the computing device and at least one of: the first value based on no value being retained in the value store or the second value based on the second value being retained in the value store.

5. The computing device of claim 4, wherein the receipt of the second value triggers the occurrence of the broadcast time in response to determining that the second value is less than the first value.

6. The computing device of claim 4, wherein the broadcast time occurs with a predetermined periodicity starting with an initial broadcast time, the predetermined periodicity being less than the first predetermined amount of time.

7. The computing device of claim 6, wherein the computer storage media comprise further computer-executable instructions, which, when executed by the one or more processing units cause the computing device to:
randomly select a first amount of delay time that is greater than the predetermined periodicity; and
set the initial broadcast time to be the first amount of delay time after a boot of the first computing device.

8. The computing device of claim 4, wherein the computer storage media comprise further computer-executable instructions, which, when executed by the one or more processing units cause the computing device to:
receive a third value from a third computing device;
retain the third value in the value store in response to determining that the third value is greater than the first value; and
discard the third value from the value store in response to the receiving the third value having last occurred more than the first predetermined quantity of time ago;
wherein the retaining and the discarding of the third value is independent of the retaining and the discarding of the second value.

9. The computing device of claim 4, wherein the computer storage media comprise further computer-executable instructions, which, when executed by the one or more processing units cause the computing device to:
transmit the notification to an external service; and
receive, from the external service, an identification of a peer of the first computing device, the peer having been identified based on the association.

10. The computing device of claim 9, wherein the transmission of the notification to the external service is repeated with a predetermined periodicity.

11. The computing device of claim 4, wherein the computer storage media comprise further computer-executable instructions, which, when executed by the one or more processing units cause the computing device to:
transmit the notification to the second computing device based on the second value being retained in the value store; and
receive, from the second computing device, an identification of a peer of the first computing device.

12. The computing device of claim 4, wherein the association between the computing device and the second value is based on the second value being retained in the value store for more than second predetermined amount of time, the second predetermined amount of time being at least twice as long as the first predetermined amount of time.

13. The computing device of claim 4, wherein the computer-executable instructions causing the computing device to generate the notification further comprise computer-executable instructions, which, when executed, cause the computing device to generate the notification of the association between the computing device and both the second value and a third value based on both the second and third values being simultaneously retained in the value store.

14. The computing device of claim 4, wherein the computer-executable instructions causing the computing device to broadcast the first value further comprise computer-executable instructions, which, when executed, cause the computing device to specify a maximum quantity of hops for the broadcasting of the first value.

15. The computing device of claim 14, wherein the one or more computer storage media comprise further computer-executable instructions, which, when executed by the one or more processing units, cause the computing device to:
determine a distance between the computing device and the second computing device based on a difference between the maximum quantity of hops and a quantity of hops remaining associated with the receipt of the second value that was broadcast by the second computing device; and
wherein the notification of the association between the computing device with the second value further comprises an indication of the determined distance between the computing device and the second computing device.

16. A method of automatically grouping computing devices based on network proximity, the method comprising:
randomly generating a first value at a first computing device;
randomly generating a second value at a second computing device;
periodically broadcasting the first value from the first computing device;
retaining, in a value store of the second computing device, the first value and preventing initiation of periodic broadcasts of the second value from the second computing device in response to determining, at the second computing device, that the first value is greater than the second value;
commencing periodic broadcasts of the second value from the second computing device in response to determining, at the second computing device, that the first value is less than the second value; and
retaining, in a value store of the first computing device, the second value and terminating the periodic broadcasting of the first value from the first computing device in response to determining, at the first computing device, that the first value is less than the second value.

17. The method of claim 16, further comprising:
randomly generating a third value at a third computing device;
commencing periodic broadcasts of the third value from the third computing device in response to determining, at the third computing device, that the first value is less than the third value;
retaining, in the value store of the first computing device, the third value in response to determining, at the first computing device, that the first value is less than the third value, wherein the value store of the first computing device already has retained therein the second value in response to the prior determination, at the first computing device, that the first value is less than the second value;
retaining, in the value store of the second computing device, the third value and terminating the periodic broadcasts of the second value from the second computing device in response to determining, at the second computing device, that the second value is less than the third value; and
no longer retaining the second value in the value store of the first computing device in response to no longer receiving, at the first computing device, the second value due to the termination of the periodic broadcasts of the second value from the second computing device.

18. The method of claim 16, further comprising:
randomly generating a third value at a third computing device;

commencing periodic broadcasts of the third value from the third computing device in response to determining, at the third computing device, that the first value is less than the third value; and retaining, in the value store of the first computing device, the third value in response to determining, at the first computing device, that the first value is less than the third value, wherein the value store of the first computing device already has retained therein the second value in response to the prior determination, at the first computing device, that the first value is less than the second value;

wherein the periodic broadcasts of the third value do not reach the second computing device; and wherein further the first computing device continues to retain, in the value store of the first computing device, both the second and third values due to the first computing device continuing to receive both the periodic broadcasts of the second value from the second computing device and the periodic broadcasts of the second value from the second computing device.

19. The method of claim 18, further comprising:

setting a maximum quantity of hops of the broadcasting of the first value to a first maximum quantity;

setting a maximum quantity of hops of the broadcasting of the second value to the first maximum quantity; and setting a maximum quantity of hops of the broadcasting of the third value to a second maximum quantity differing from the first maximum quantity.

20. The method of claim 16, further comprising:

transmitting, from the second computing device, to the first computing device, a notification associating the second computing device with the first value in response to determining, at the second computing device, that the first value is greater than the second value;

associating, at the first computing device, both the first and second computing devices with a first group of computing devices based on receiving the notification associating the second computing device with the first value;

transmitting, from the first computing device, to the second computing device, a notification associating the first computing device with the second value in response to determining, at the first computing device, that the first value is less than the second value; and associating, at the second computing device, both the first and second computing devices with the first group of computing devices based on receiving the notification associating the first computing device with the second value.

* * * * *